US010064061B2

(12) United States Patent
Tseng et al.

(10) Patent No.: US 10,064,061 B2
(45) Date of Patent: Aug. 28, 2018

(54) METHOD AND SYSTEM OF LOCATION INFORMATION BASED COMMUNICATION CONTROL

(71) Applicant: Industrial Technology Research Institute, Hsinchu (TW)

(72) Inventors: Yung-Lan Tseng, Taoyuan (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 418 days.

(21) Appl. No.: 14/788,674

(22) Filed: Jun. 30, 2015

(65) Prior Publication Data

US 2016/0112877 A1 Apr. 21, 2016

Related U.S. Application Data

(60) Provisional application No. 62/063,975, filed on Oct. 15, 2014.

(51) Int. Cl.
*H04W 12/08* (2009.01)
*H04W 74/00* (2009.01)
(Continued)

(52) U.S. Cl.
CPC ........... *H04W 12/08* (2013.01); *H04W 4/021* (2013.01); *H04W 74/006* (2013.01); *H04W 76/023* (2013.01); *H04W 76/14* (2018.02)

(58) Field of Classification Search
CPC ... H04W 12/08; H04W 74/006; H04W 4/021; H04W 76/023
(Continued)

(56) References Cited

U.S. PATENT DOCUMENTS 5,214,789 A 5/1993 George
7,383,050 B2 6/2008 Kall et al.
(Continued)

FOREIGN PATENT DOCUMENTS

CN 102792720 11/2012
CN 103718514 4/2014
EP 2763461 8/2014

OTHER PUBLICATIONS

"Office Action of Taiwan Counterpart Application," dated Mar. 20, 2017, p. 1-p. 14.
(Continued)

*Primary Examiner* — Michael Mapa
(74) *Attorney, Agent, or Firm* — JCIPRNET

(57) ABSTRACT

A method and system of location information based communication control is provided. The method includes step of performing an access control to one or more resources by a master base station (MBS) generating one or more access control parameters of the resource based on one or more feedback information provided by one or more communication devices (CDs), and the CDs includes one or more user equipments (UEs) and/or one or more small base stations (SBSs). The method of further includes step of recognizing a control area (CA) by the MBS based on a location information included in the feedback information, and step of delivering out by the MBS the one or more access control parameters for having a group of user equipments located in the CA to access the resources based on the access control parameters.

48 Claims, 17 Drawing Sheets

(51) Int. Cl.
*H04W 4/02* (2018.01)
*H04W 76/02* (2009.01)
*H04W 4/021* (2018.01)
*H04W 76/14* (2018.01)

(58) Field of Classification Search
USPC .... 455/404.2, 414.2, 414.1, 418–420, 435.1, 455/456.1–457, 450–453; 370/332, 395.4
See application file for complete search history.

(56) References Cited

U.S. PATENT DOCUMENTS

| | | | |
|---|---|---|---|
| 8,359,038 B2 | 1/2013 | Hakola et al. | |
| 8,498,255 B2 | 7/2013 | Wang et al. | |
| 8,780,835 B2 | 7/2014 | Hakola et al. | |
| 8,885,507 B2 | 11/2014 | Chen et al. | |
| 8,965,377 B2 | 2/2015 | Zhang et al. | |
| 2011/0194495 A1* | 8/2011 | Seo | H04W 16/12 370/328 |
| 2012/0243431 A1* | 9/2012 | Chen | H04W 72/0406 370/252 |
| 2012/0282922 A1 | 11/2012 | Fodor et al. | |
| 2013/0022010 A1 | 1/2013 | Qianxi et al. | |
| 2013/0109301 A1 | 5/2013 | Hakola et al. | |
| 2013/0157676 A1 | 6/2013 | Baek et al. | |
| 2014/0016494 A1 | 1/2014 | Van Phan et al. | |
| 2014/0038653 A1 | 2/2014 | Mildh et al. | |
| 2014/0153390 A1* | 6/2014 | Ishii | H04W 28/0289 370/230 |
| 2014/0185530 A1 | 7/2014 | Kuchibhotla et al. | |
| 2014/0211705 A1 | 7/2014 | Baek | |
| 2014/0254523 A1 | 9/2014 | Chai et al. | |
| 2015/0045050 A1* | 2/2015 | Sartori | H04W 8/005 455/452.1 |
| 2015/0223279 A1* | 8/2015 | Jiao | H04W 48/12 370/312 |
| 2016/0227518 A1* | 8/2016 | Li | H04W 72/042 |

OTHER PUBLICATIONS

S2-142228 "Extended ProSe WID", Qualcomm, 3GPP TSG SA WG2 Meeting #103 Phoenix, Arizona, USA, May 19-23, 2014, pp. 1-5.

Li et al., "CA-P2P: Context-Aware Proximity-Based Peer-to-Peer Wireless Communications", IEEE Communications Magazine, Jun. 2014, pp. 32-41.

Wang et al., "Delay-Aware Cross-Layer Design for Device-to-Device Communications in Future Cellular Systems", IEEE Communications Magazine, Jun. 2014, pp. 133-139.

Wang et al., "Resource Allocation in Central-Controlled Device-to-Device Communications Networks", IEEE Globecom 2013—Wireless Networking Symposium, Dec. 2013, pp. 4871-4876.

Gao et al., Radio resource management of D2D communication, Proceedings of the 2014 IEEE ICCS, Nov. 2014, pp. 6-10.

Lu et al., Application-Aware Opportunistic D2D Link Schedulers: Traffic Offloading and User Perceived QoS, retrieved from http://users.ece.utexas.edu/~gustavo/papers/LuD14.pdf, 2014.

Tiirola et al., "On the Design of Discovery Patterns for Half-Duplex TDD Nodes Operating in Frame-Based Systems", IEEE Future Network and Mobile Summit (FutureNetworkSummit), 2013, Jul. 2013, pp. 1-9.

"Office Action of Taiwan Counterpart Application," dated Jul. 21, 2016, p. 1-p. 14.

* cited by examiner

```
┌─────────────────────────────────────────────────────────────────────┐
│ delivering by the MBS a control area information (CAI) of the recognized │
│ CA for having one or more UEs serving by the MBS verify whether    │
│ locate in the CA based on a comparison of the CAI with own detected │──410
│ location information of the UEs serving by the MBS, wherein the MBS │
│ delivering the CAI and the access control parameters to the UEs    │
│ serving by the MBS                                                  │
└─────────────────────────────────────────────────────────────────────┘
                                    ↓
┌─────────────────────────────────────────────────────────────────────┐
│ deciding by the MBS whether one of one or more small cell           │
│ identifications (IDs) locate in the CA and the CAI includes a small cell │──412
│ ID list that includes the small cell IDs located in the CA, wherein the │
│ location information includes the small cell IDs detected by the CDs │
└─────────────────────────────────────────────────────────────────────┘
                                    ↓
┌─────────────────────────────────────────────────────────────────────┐
│ wherein the location information comprises one or more global position │
│ system (GPS) coordinates and the CAI includes a GPS information of │
│ the CA, wherein the GPS information comprises at least one of a radius │──414
│ with one of the GPS coordinates as origin to represent a circular area, │
│ or a plurality of the GPS coordinates as vertices to represent a polygon │
└─────────────────────────────────────────────────────────────────────┘

┌─────────────────────────────────────────────────────────────────────┐
│ deciding by the MBS whether one of one or more small cell           │
│ identifications (IDs) locate in the CA, wherein the location information │
│ includes the small cell IDs detected by the CDs, wherein the MBS    │──420
│ decides whether the one of the small cell IDs locate in the CA based on │
│ a comparison of a threshold-R with an aggregating number of the one │
│ of the small cell IDs provided within a time period, to recognize the CA │
└─────────────────────────────────────────────────────────────────────┘
```

FIG. 4

820 — deciding by the MBS whether one of one or more small cell identifications (IDs) locate in the CA, wherein the MBS delivering the access control parameters to one or more SBSs located in the CA, for having one or more SBSs located in the CA deliver the access control parameters to one or more UEs serving by the SBSs located in the CA for having the UEs serving by the SBSs located in the CA to access the resources based on the access control parameters 822 — wherein the feedback information further comprise an overload or under-load indication of a resource applied for user equipments to deliver message, and the feedback information are provided by one or more UEs serving by the MBS 824 — wherein the feedback information further comprise an overload or under-load indication of a resource applied for user equipments to deliver message, and the overload or under-load indication reports from one or more UEs serving by a SBS respectively, and the location information includes own small cell ID of the SBS serving said UEs, wherein the SBSs serving said UEs provide the feedback information to the MBS 826 — wherein the feedback information further comprise an overload or under-load indication of a resource applied for user equipments to deliver message, and the feedback information are provided from the SBSs and the location information comprises the SBSs' own small cell ID respectively

FIG. 8

METHOD AND SYSTEM OF LOCATION INFORMATION BASED COMMUNICATION CONTROL

CROSS-REFERENCE TO RELATED APPLICATION

The application claims the priority benefit of U.S. provisional application Ser. No. 62/063,975 filed on Oct. 15, 2014. The entirety of the above-mentioned patent application is hereby incorporated by reference herein and made a part of this specification.

TECHNICAL FIELD

The technical field is related to a method and system of location information based communication control.

BACKGROUND

3GPP agreed to support ProSe D2D service (Proximity Device-to-Device Service), which includes direct discovery and direct communication. However, at this stage, the study about the access control is still not enough especially the study for the ProSe D2D resource allocation. Take the ProSe D2D service as an example, the ProSe D2D service can be divided into ProSe discovery and ProSe communication, which enable nearby devices to discover and communicate with neighbor devices directly through air links.

The communication service could cover both in-coverage scenario and out-of-coverage scenario, which represents the communication service is achieved in the coverage of long term evolution (LTE) network or out of the coverage of the LTE network. For the convenience of description, we take the ProSe D2D service as an example and use the terminologies 'direct discovery' and 'direct communication' to represent the 'in-coverage ProSe discovery' and 'in-coverage ProSe communication' respectively. Next, we will introduce direct discovery and direct communication respectively.

The conceptual graph of discovery resource and discovery signal of direct discovery is shown in FIG. 1. Macro Base Station (MBS) can allocate communication radio resource, e.g. discovery radio resource pool, scheduling assignment message pool, data resource pool etc., in each sub-frame dynamically or semi-persistently. The resource pool is a block of radio resource which is as long as a time period in the time domain and one or more than one frequency subcarriers in the frequency domain. The resource pool may be further divided into multiple resource blocks, which each resource block occupies the same number of time unit and frequency carriers. In each message transmission, UE select one resource block randomly from the resource pool to transmit messages. MBS may provide multiple resource pools for message transmission. There are two resource allocation approaches for direct discovery, Type 1 and Type 2 resource allocation, for MBS to allocate radio resource to User Equipment (UE). In Type 1 resource allocation, MBS allocates the radio resource pool for UEs to transmit signals on a randomly selected resource pool. In Type 2 resource allocation, MBS schedules dedicated radio resource for UEs to transmit signals on the resource pool semi-persistently.

To support direct discovery, transmission and reception of discovery messages should be supported to both radio resource control (RRC) idle mode (RRC_idle) UEs and RRC connected mode (RRC_Connected) UEs. To Type 2 resource allocation, UEs need to stay in the RRC_Connected state to acquire dedicated radio resource from the MBS. Nevertheless, MBS can implement Type 1 resource allocation by broadcasting the configuration of discovery resource pool. Through Type 1 resource allocation, both the RRC_Connected UEs and RRC_idle UEs can realize direct discovery by delivering discovery signals in a contention-based manner.

The conceptual graph of direct communication is also shown in FIG. 1. To direct communication, MBS may allocate communication radio resource semi-persistently. For a UE who wants to deliver communication data, it needs to deliver a 'scheduling assignment' (SA) message to indicate the information of the radio resources for interested UEs to receive the following D2D data. Therefore, MBS needs to allocate both the SA radio resource pool and D2D data resource pool to UEs.

There are two resource allocation approaches for direct communication, Mode 1 and Mode 2 resource allocation, In Mode 1 resource allocation, MBS provides dedicated radio resource to UE in the SA pool for UE to deliver SA. UEs need to stay in the RRC_Connected state to acquire and access the dedicated radio resource from MBS. In Mode 2 resource allocation, UE will randomly select the radio resource in the SA pool to transmit its SA and the following data. So, the Mode 2 allocation is a contention-based approach.

The UE may not transmit and receive D2D messages (discovery signals, SA message, or D2D data) simultaneously. The UE plays the role of transmitter $U_{TX}$ when it wants to deliver D2D messages or it plays the role of receiver $U_{RX}$ when it wants to receive the D2D messages from neighbor UEs. Furthermore, UE may need to receive all of the receiver (Rx) resource pool and decode every resource block in the Rx resource pool to find out, for example, the D2D messages which it is interested in. UE can switch its role between $U_{TX}$ and $U_{RX}$ in every sub-frame or it can also only be $U_{TX}$ or $U_{RX}$ persistently. Also the MBS may assign different radio resource for the transmitter (Tx) pool and the Rx pool to one UE for D2D message transmission and reception respectively.

There are two resource allocation approaches for MBS to allocate SA resource pool and data resource pool. These two approaches are contention-based resource allocation approach and scheduling resource allocation approach which applied to support direct discovery and direct communication. The contention-based resource allocation (Type 1 resource allocation in direct discovery and Mode 2 resource allocation in direct communication) supports both RRC_Connected UEs and RRC_idle UEs to be able to realize in-coverage ProSe D2D service. Connected UE may keep its cellular link with the MBS and it switches to transmit/receive D2D messages in different sub-frames. Idle UE may turn on its RF chain to transmit/receive D2D messages only in some sub-frames which D2D radio resource is provided. contention-based resource allocation approach may have the local congestion phenomenon. To ProSe D2D service, the congestion issue would be more difficult to solve because it becomes a local congestion phenomenon under the coverage of MBS. Such that to solve the possible local congestion issue in a communication network, a communication control mechanism for the resource allocation of communication network services is on demand.

SUMMARY

Exemplary embodiments in accordance of the application provide a method and system of location information based communication control.

An exemplary embodiment of the application provides a method of location information based communication control. The method of location information based communication control includes step of performing an access control to one or more resources by a master base station (MBS) generating one or more access control parameters of the resources based on one or more feedback information provided by one or more communication devices (CDs), and the CDs include one or more user equipments (UEs) and/or one or more small base stations (SBSs). The method of location information based communication control further includes step of recognizing a control area (CA) by the MBS based on a location information included in the feedback information, and step of delivering out by the MBS the one or more access control parameters for having a group of user equipments located in the CA to access the resources based on the access control parameters.

An exemplary embodiment of the application provides a system of location information based communication control. The system of location information based communication control includes a master base station (MBS). The MBS includes a receiving unit receiving one or more feedback information provided by one or more communication devices (CDs), and the CDs include one or more user equipment (UEs) and/or one or more small base stations (SBSs). The MBS further includes a processing unit performing an access control to one or more resources by generating one or more access control parameters of the resources based on the feedback information and recognizing a control area (CA) based on a location information included in the feedback information, and a transmitting unit delivering out the one or more access control parameters for having a group of user equipments located in the CA to access the resources based on the access control parameters.

Another exemplary embodiment of the application provides a system of location information based communication control. The system of location information based communication control includes a communication device (CD) includes a processing unit generating one or more feedback information, and the feedback information include a location information for having a master base station (MBS) recognizes a control area (CA). The system of location information based communication control further includes a transmitting unit delivering out the feedback information for having the MBS provides one or more access control parameters of one or more resources, and a receiving unit receiving message or the access control parameters provided by the MBS for having a group of user equipments located in the CA to access the resources based on the access control parameters.

In order to make the aforementioned and other features and advantages of the disclosure comprehensible, several exemplary embodiments accompanied with Figures are described in details below.

BRIEF DESCRIPTION OF THE DRAWINGS

The accompanying drawings are included as exemplary embodiments to provide a further understanding of the disclosure, and are incorporated in and constituted a part of this specification. The drawings show exemplary embodiments of the disclosure and, together with the description, serve to explain the principles of the disclosure.

FIG. 4 shows flowcharts of exemplary embodiments of control area (CA) and control area information (CAI) recognition based on feedback small cell identifications (IDs) or global position system (GPS) information.

FIG. 8 shows flowcharts of more exemplary embodiments of a method of location information based communication control.

DETAILED DESCRIPTION OF THE EXEMPLARY EMBODIMENTS

In this disclosure, we will demonstrate the exemplary embodiments of method and system in a network environment supports direct message transmission. And partial embodiments are based on the 3GPP's agreement on ProSe D2D service (Proximity Device-to-Device Service), for demonstration purpose only. However, the disclosed embodiments could also be applied to other point to point communication scenario and are not limited by the ProSe D2D service. Exemplary embodiments of method and system of location information based communication control for the access control for resource allocation are disclosed, which master base station (MBS), could also be called extended Node B (eNB), for example macro base station, or master micro base station etc., provides control parameters dynamically to communication devices (CDs) for having user equipments (UEs) located on a small area.

In some of the exemplary embodiments, the MBS decides the control parameters and the range of access control, which is called the control area (CA), through the help of feedback information. The feedback information are provided by the communication equipments, such as user equipments (UEs) and/or small base stations (SBSs). Many other exemplary embodiments are provided, to show how the communication equipments, UEs and/or SBSs, facilitate the disclosed access control for resource allocation mechanism through different approaches. In the application, we will disclose a method and system of location information based communication control for the access control for resource allocation that may be applied, for example to the contention-based resource allocation, but not be limited.

Figure 1:
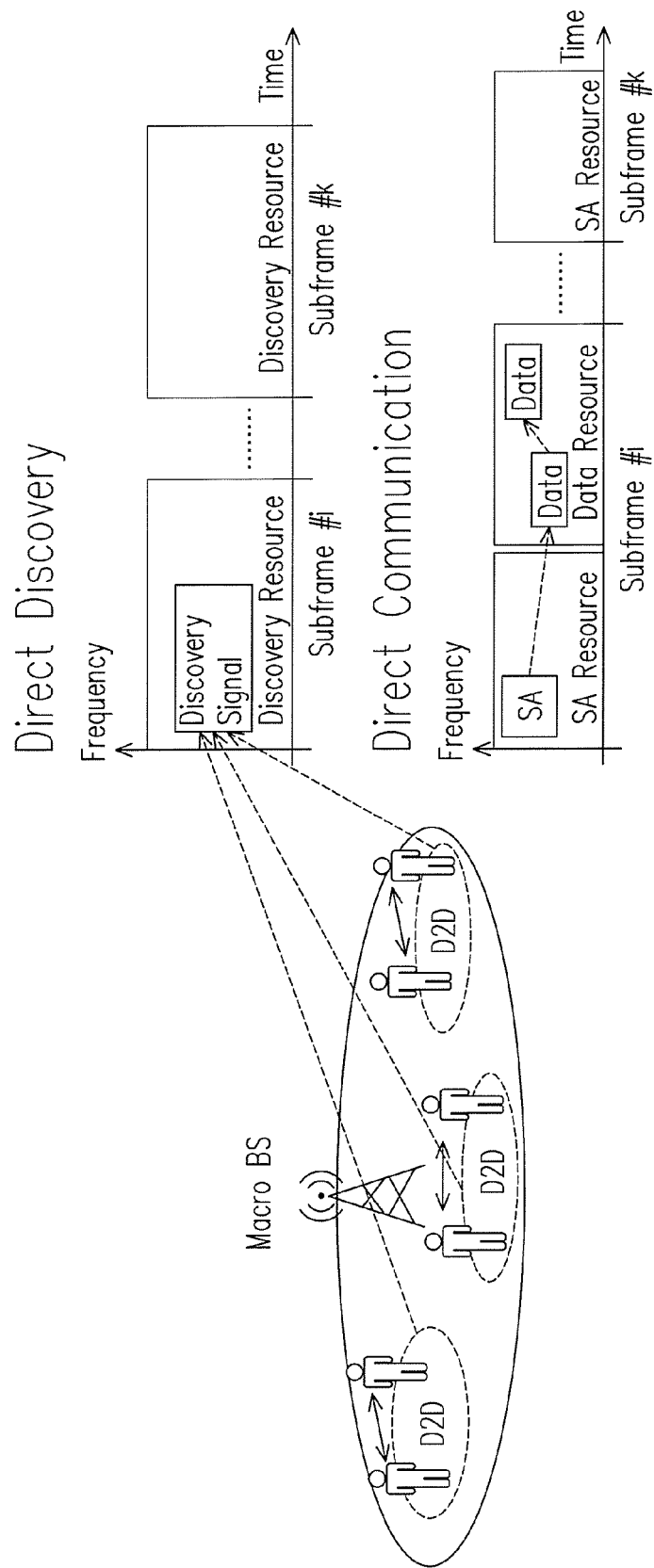
FIG. 1 shows conceptual graph of discovery signal of direct discovery and direct communication.
Figure 2:
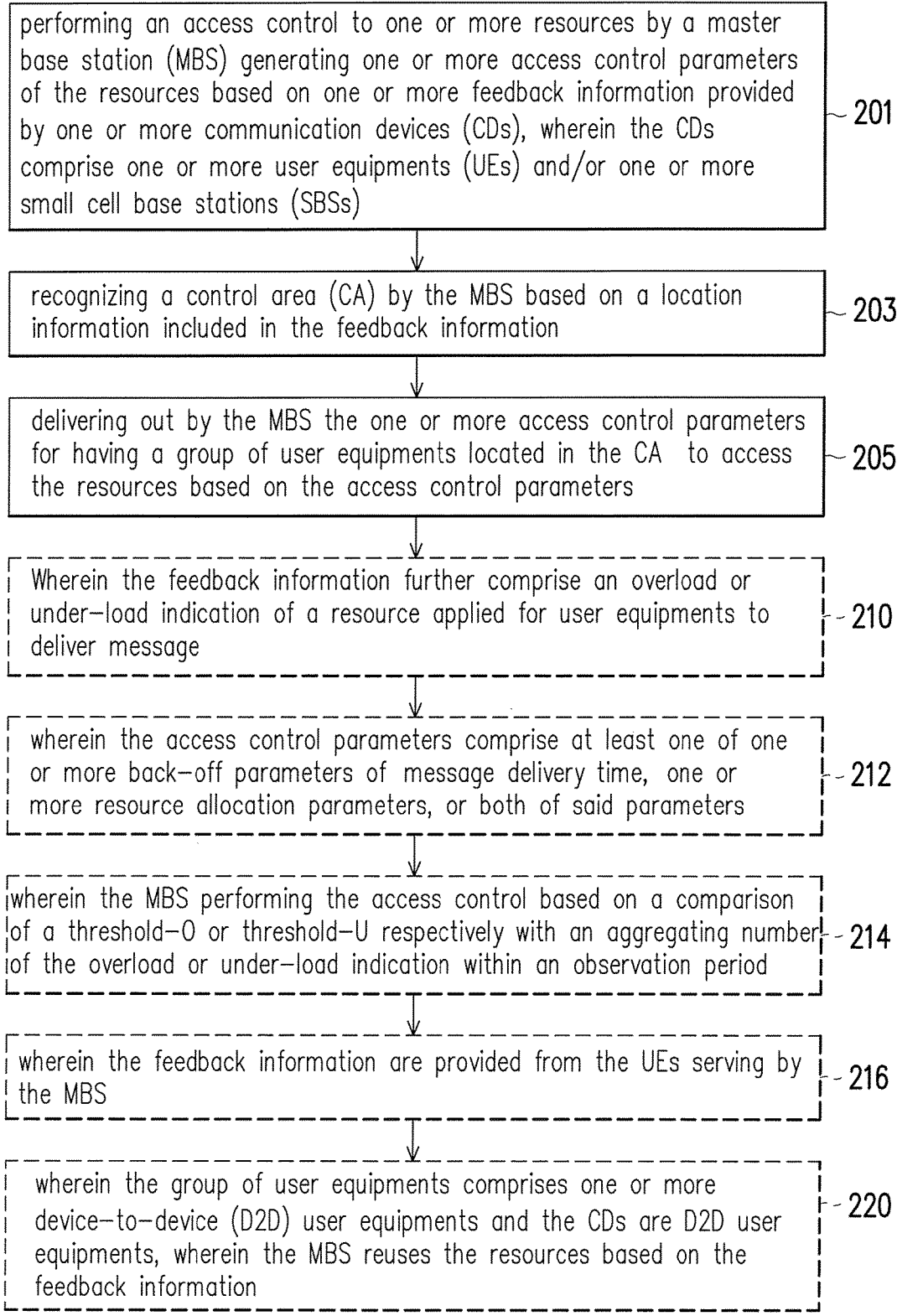
FIG. 2 shows flowcharts of exemplary embodiments of a method of location information based communication control.

FIG. 2 shows flowcharts of exemplary embodiments of method of location information based communication control in a network environment supports direct message transmission. The method includes step 201 to step 205 for a master base station (MBS) to perform communication control. Step 201 of the method performing an access control to one or more resources by a MBS generating one or more access control parameters of the resources based on one or more feedback information provide from one or more communication devices (CDs). The CDs include one or more user equipments (UEs) and/or one or more small base stations (SBSs). Step 203 of the method recognizing a control area (CA) by the MBS based on a location information included in the feedback information. And step 205 of the method delivering out by the MBS the one or more access control parameters for having a group of user equipments located in the CA to access the resources based on the access control parameters. The range of access control, which is called the Control Area (CA) in the application.

In an embodiment, UE which is playing the role of receiver (Rx) could monitor its Tx/Rx resource pool. UE sends an overload or under-load indication to its serving base station, which could be MBS or SBS, when the monitoring transmitter (Tx) pool is congested or underutilized respectively. In some embodiments, the SBS could also monitor the Tx/Rx resource pool of UEs serving by it. MBS collects the overload/under-load indication from different CDs. Some embodiments of the method as shows in step 210, the feedback information may further include an overload or under-load indication of a resource applied for user equipments to deliver message. In some embodiments of the method, the access control parameters may include at least one of one or more back-off parameters of message delivery time, one or more resource allocation parameters, or both of said parameters as shows in step 212. MBS may deliver the access control parameters through broadcasting or dedicated signaling. As shows in step 214 in some embodiments of the method, the MBS may perform the access control based on a comparison of a pre-defined threshold-O or threshold-U respectively with an aggregating number of the overload or under-load indication within an observation period. In an embodiment, MBS may decide to trigger the access control when the number of overload or under-load indications during a pre-defined observation period exceeds the threshold-O or threshold-U respectively. Some embodiments of the method as shows in step 216, the feedback information may be provided by the UEs serving by the MBS. Furthermore, some embodiments of the method as shows in step 220, the group of user equipments may include one or more D2D user equipments and the CDs are D2D user equipments, and the MBS may reuse the resources based on the feedback information.

Figure 3A:
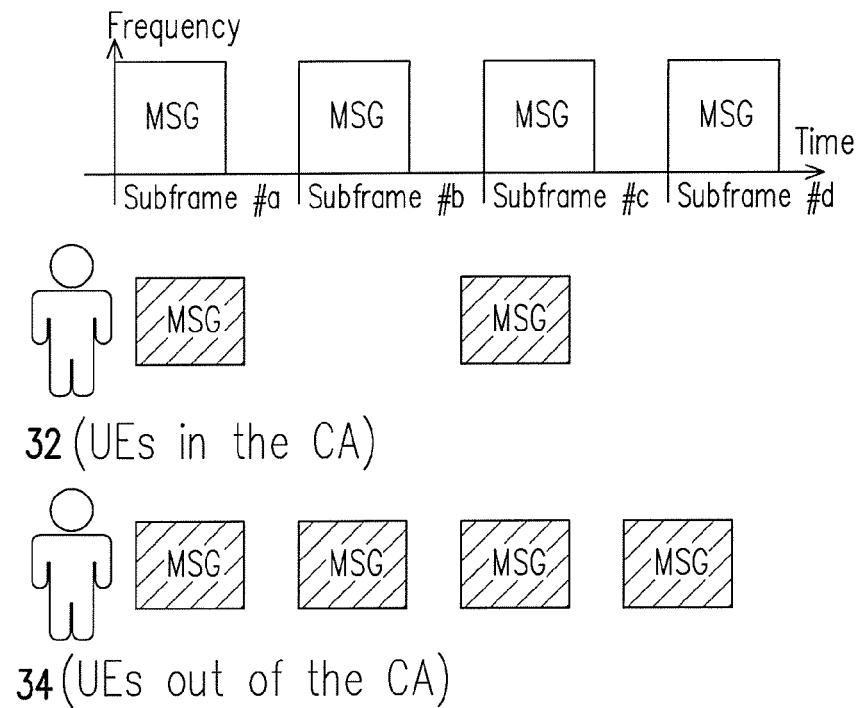
FIG. 3A shows conceptual graph of an exemplary embodiment of back-off parameters of message delivery time.

As shows in conceptual graph of FIG. 3A, an exemplary embodiment of back-off parameters of message delivery time is disclosed. For example, UEs 32 in the CA may receive an indication to back-off a period of time before broadcasting messages. The back-off period can be a randomly decided value or a fixed value. In the opposite, UEs 34 out of the CA may deliver messages without postpone.

Figure 3B:
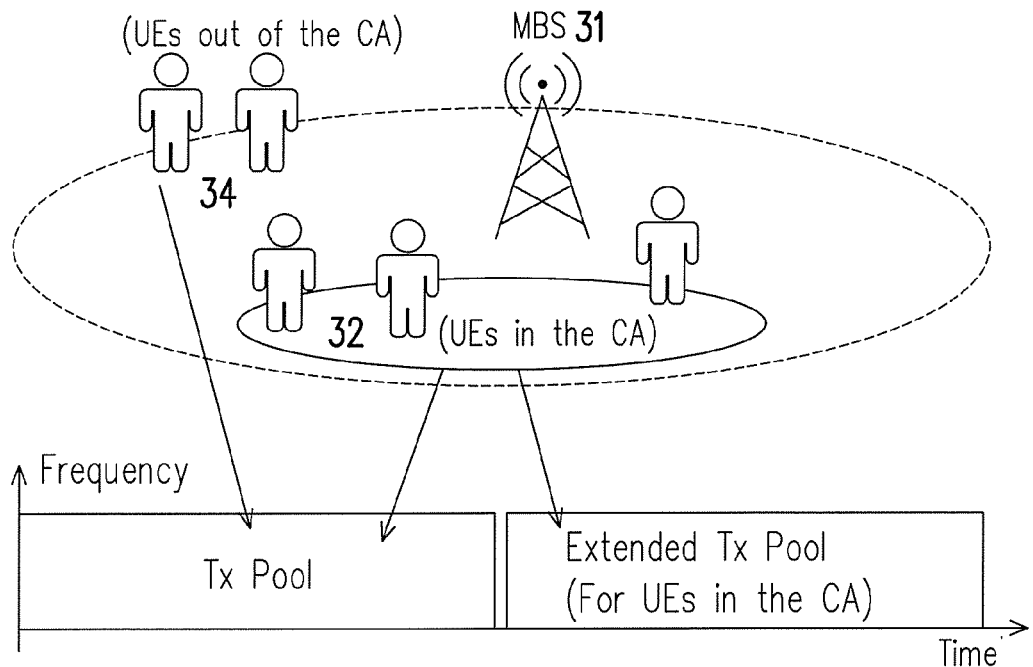
FIG. 3B shows conceptual graph of an exemplary embodiment of resource allocation parameters.

An exemplary embodiment of resource allocation parameters shows in the conceptual graph of FIG. 3B. As shows in FIG. 3B, when the overload condition happens, MBS 31 may allocate an extra extended Tx pool for the UEs 32 in the CA to deliver messages. UEs 34 out of the CA may not be allowed to access the extended Tx pool. In this embodiment, MBS 31 may also provide the configuration information about the extended Tx pool into the Rx resource pool configuration to all of the UEs to receive messages. Resource pool configuration may include the position information of the resource pool in time domain and frequency domain, or the total size of resource pool. The resource pool may be furthered divided into multiple equal-size resource blocks and each resource block is indexed in order. So, the position information of resource pool may be realized by showing the index of $1^{st}$ resource block and the last resource block in the resource pool. Resource pool configuration may also include the periodicity information when the resource pool is assigned periodically in the time domain. So, UEs 32 in the CA can deliver messages by randomly one resource block from the Tx pool or extended Tx pool. In contrast, UEs 34 out of the CA can only deliver messages by randomly select one resource block from the Tx pool. To UEs 32, 34 who want to receive messages, they can receive the messages on Tx pool and extended Tx pool because both the configuration of Tx pool and extended Tx pool are provided by MBS 31 in the configuration of Rx resource pool configuration. While when the local under-load condition happen, MBS 31 may shorten the back-off parameters or shrink the Tx radio resource or extended Tx pool, which will be described in details.

The small cell of a so called small cell network could be regarded as a base station with much smaller RF power (usually 20~30 dBm, but not be limited), and the small cell may also be a slave base station, femto cell, pico cell, slave micro cell, or a relay node. With more and more small base stations around the communication devices (CDs), such as UEs or small base stations (SBSs) etc. for example. A UE may detect the small cell identifications (IDs) of small cells around it including the small cell ID of small base station that serving it, and forward the detected small cell IDs as the location information to the MBS. A small base station may also use its own small cell ID and forward the small cell IDs as the location information to the MBS.

FIG. 4 shows flowcharts of exemplary embodiments of control area (CA) and control area information (CAI) recognition based on small cell identifications (IDs) or global position system (GPS) information. Referring to step 410, some embodiments of the method may further deliver by the MBS a CA information (CAI) of the recognized CA for having one or more UEs serving by the MBS verify whether locate in the CA based on a comparison of the CAI with own detected location information of the UEs serving by the MBS, and the MBS may further deliver the CAI and the access control parameters to the UEs serving by the MBS.

In some embodiments, the method may further decide by the MBS whether one of one or more small cell identifications (IDs) locate in the CA and the CAI includes a small cell ID list that includes the small cell IDs locate in the CA, wherein the location information includes the small cell IDs detected by the CDs, as shows in step 412.

With the progress of communication devices, such as smart phone or base station etc. for example, it is common for CDs to be embedded with Global Navigation Satellite System (GNSS). So, a CD may also attach its own GPS (Global Positioning System) coordinates as the location information to MBS.

Referring to the step 414, in some embodiments of the method the location information may include one or more global position system (GPS) coordinates. In some embodiments, the CAI includes a GPS information of the CA, the GPS information may include at least one of a radius with one of the GPS coordinates as the origin to represent a circular area or a plurality of the GPS coordinates as the vertices to represent a polygon, as shows in step 414.

The location information based communication control method may further decide by the MBS whether one of one or more small cell identifications (IDs) locate in the CA, wherein the location information includes the small cell IDs detected by the CDs, as refers in step 420. In some embodiment, the MBS may decide whether the one of the small cell IDs locate in the CA bases on a comparison of a pre-defined threshold-R with an aggregating number of the one of the small cell IDs be provided within a time period, to recognize the CA, as shows in step 420.

Figure 5:
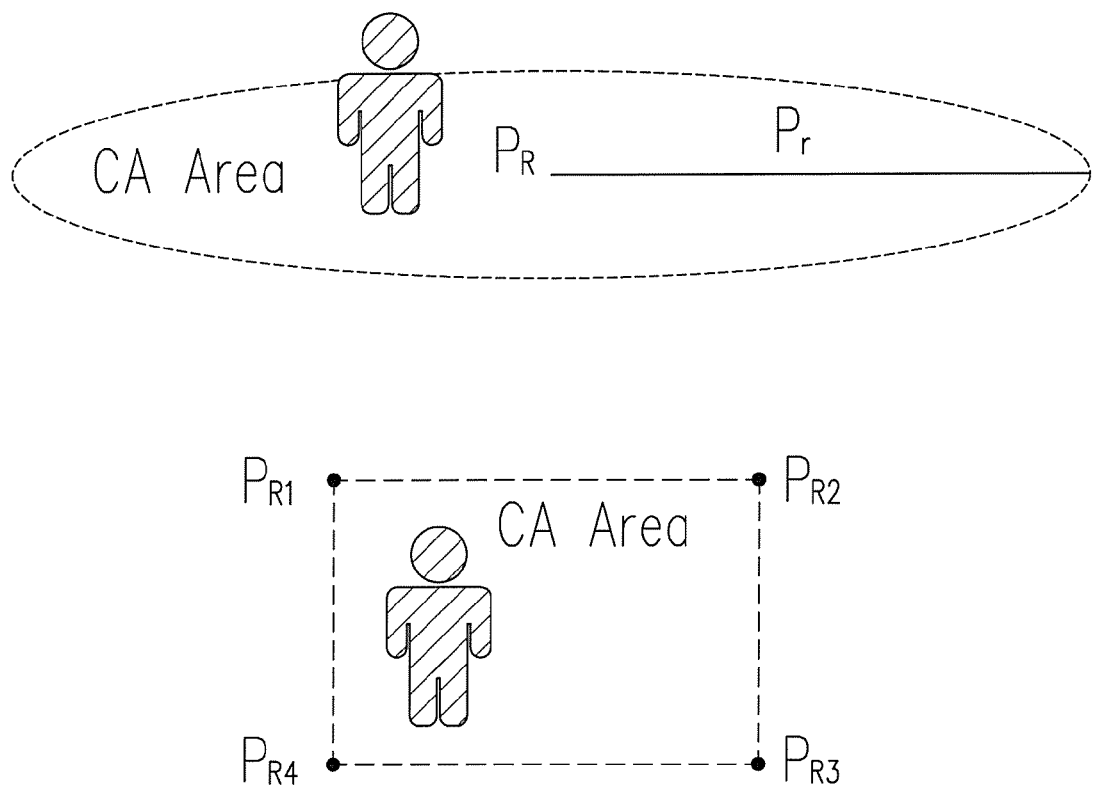
FIG. 5 shows conceptual graph of exemplary embodiments of CAI indication through GPS coordinates.

Referring to the FIG. 5, it shows conceptual graph of exemplary embodiments of control area information (CAI) indication through GPS coordinates. In an exemplary embodiment of the CAI recognition, the CA could be recognized as a circular area, which $P_R$ is the the centre of the circle and $R_r$ is the radius. MBS will provide the GPS coordinate of $P_R$ and the length of $R_r$ in the CAI and UE is located on the circular area if its distance to $P_R$ is shorter than $R_r$. In another embodiment of the CAI realization, CA may be represented by a polygon. MBS will provide the GPS coordinate of each vertex of the polygon and UE will verify if it is located on the CA based on the received GPS coordinates.

Figure 6:
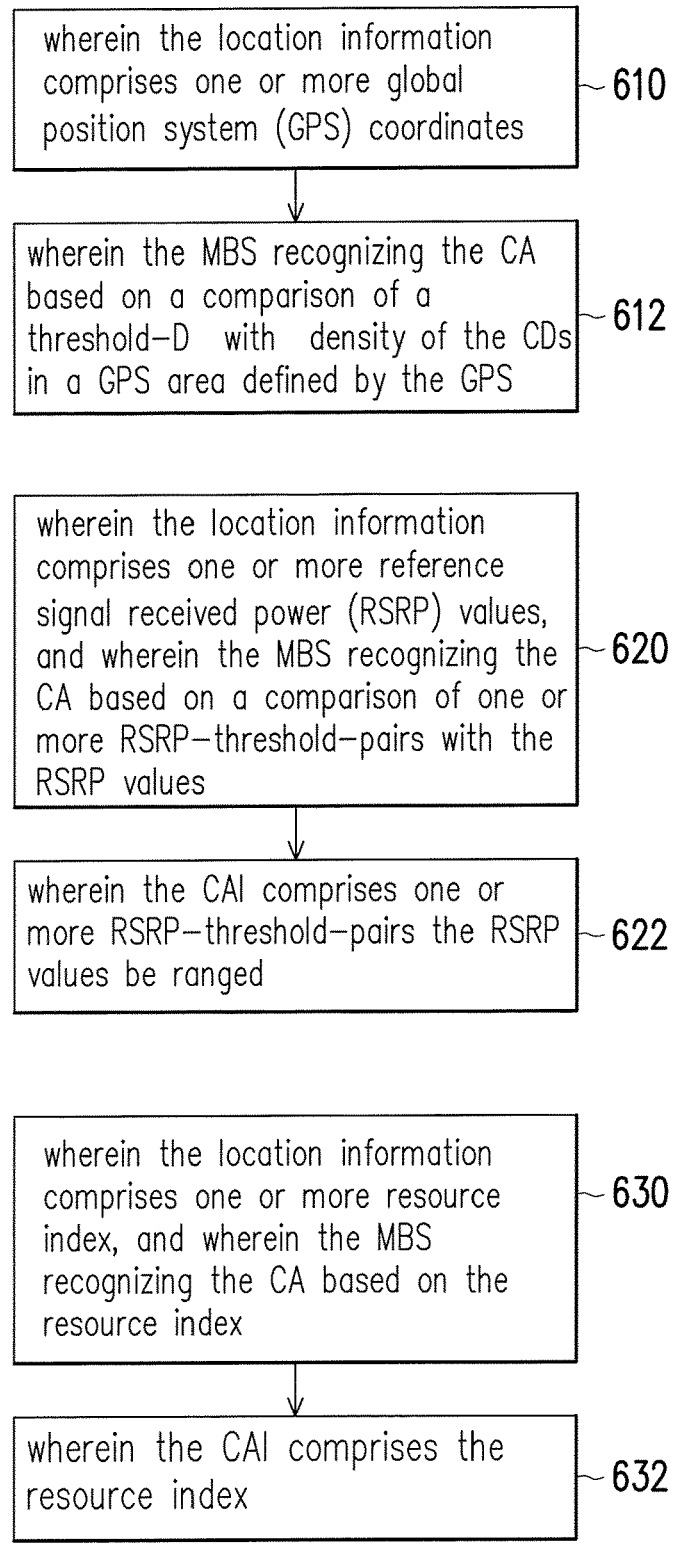
FIG. 6 shows flowcharts of exemplary embodiments of CA recognition based on feedback GPS coordinates, reference signal received power (RSRP) values, or resource index.

FIG. 6 shows flowcharts of exemplary embodiments of CA recognition based on feedback GPS coordinates, reference signal received power (RSRP) values, or resource index. Some embodiment of the method, the feedback location information may include one or more global position system (GPS) coordinates and the MBS recognizes the CA based on the GPS coordinates, as shows in step 610. Referring to the step 612, in some embodiments of the method MBS may recognize the CA based on a comparison of a pre-defined threshold-D with a density of the communication devices (CDs) in a GPS area defined by the GPS coordinates.

As shows in step 620 in some embodiments of the method, the location information may include one or more reference signal received power (RSRP) values and the MBS recognizes the CA based on a comparison of one or more pre-defined RSRP-threshold-pairs with the RSRP values. In some embodiments of the method, the CAI may include one or more RSRP-threshold-pairs the RSRP values be ranged as refers in step 622. In some embodiments of the method as shows in step 630, the location information may include one or more resource index and the MBS recognizes the CA based on the resource index. In some embodiments of the method the CAI includes the resource index, as refers in step 632.

Figure 7:
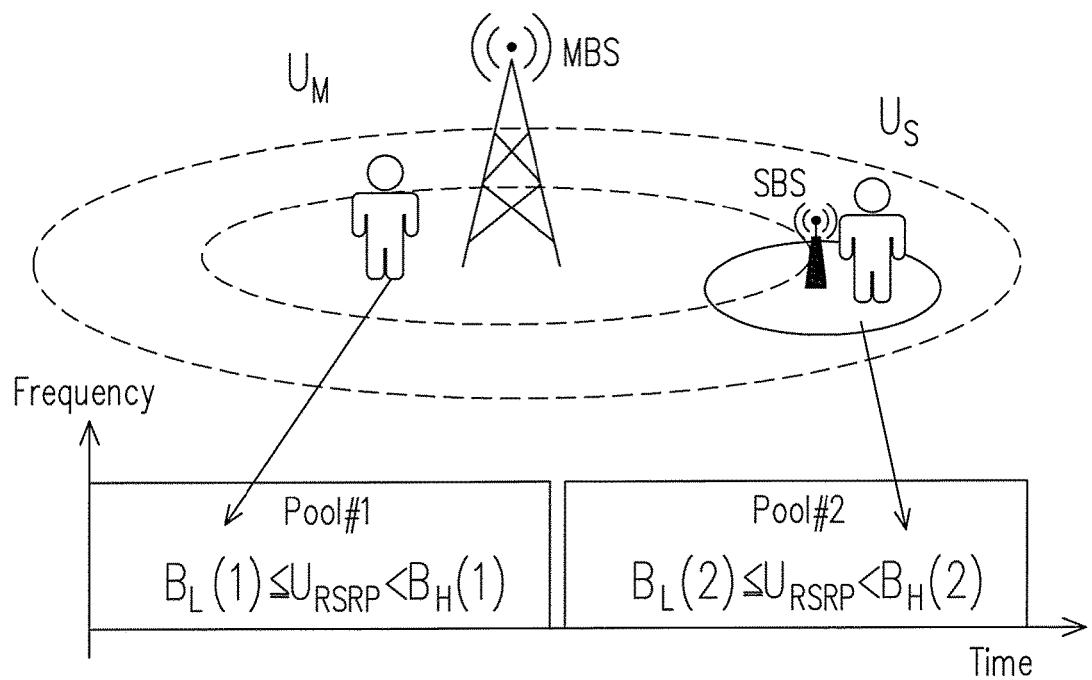
FIG. 7 shows conceptual graph of an exemplary embodiment of the MBS realizes location information based communication control based on feedback RSRP values.

As shows in FIG. 7, disclosing conceptual graph of an exemplary embodiment of the MBS realizes location information based communication control based on feedback RSRP values. The feedback location information may include RSRP values provide by the CDs. CDs could measure the Reference Signal Received Power (RSRP) values by detecting the reference signals broadcasting by MBS. The RSRP value that each CE, e.g. UE or SBS, feedbacks as location information could be an estimation value to the physical distance between the CD and MBS. In some embodiment, the CA may also be formulated by the pre-defined thresholds of each RARP. As shown in FIG. 7, MBS will deliver the RSRS-threshold-pairs {BL(i), BH(i)} about each resource pool#i provided by MBS. Each CD will measure the RSRP value, URSRP, and then compare URSRP with {BL(i), BH(i)}. UE locates in the CA could access the resource pool#i if BL(i)≤URSRP<BH(i).

FIG. 8 shows flowcharts of more exemplary embodiments of a method of location information based communication control. In some exemplary embodiments as shows in step 820, the method may further decide by the MBS whether one of one or more small cell identifications (IDs) locate in the CA. MBS may deliver the access control parameters to one or more SBSs that locate in the CA, for having one or more SBSs locate in the CA deliver the access control parameters to one or more UEs serving by the SBSs locate in the CA for having the UEs serving by the SBSs locate in the CA to access the resources based on the access control parameters.

Referring to the step 822, in some embodiments of the method, the feedback information may further include an overload or under-load indication of a resource applied for user equipments to deliver message. The feedback information may be provided by one or more UEs serving by the MBS. As shows in step 824, in some embodiments of the method the feedback information may further include an overload or under-load indication of a resource applied for user equipments to deliver message, and the overload or under-load indication reports from one or more UEs serving by a SBS respectively, and the location information includes own small cell ID of the SBS serving said UEs, wherein the SBSs serving said UEs provide the feedback information to the MBS. As shows in step 826, in some embodiments of the method the feedback information further include an overload or under-load indication of a resource applied for user equipments to deliver message, and the feedback information are provided by the SBSs and the location information includes the SBSs' own small cell ID respectively.

Figure 9:
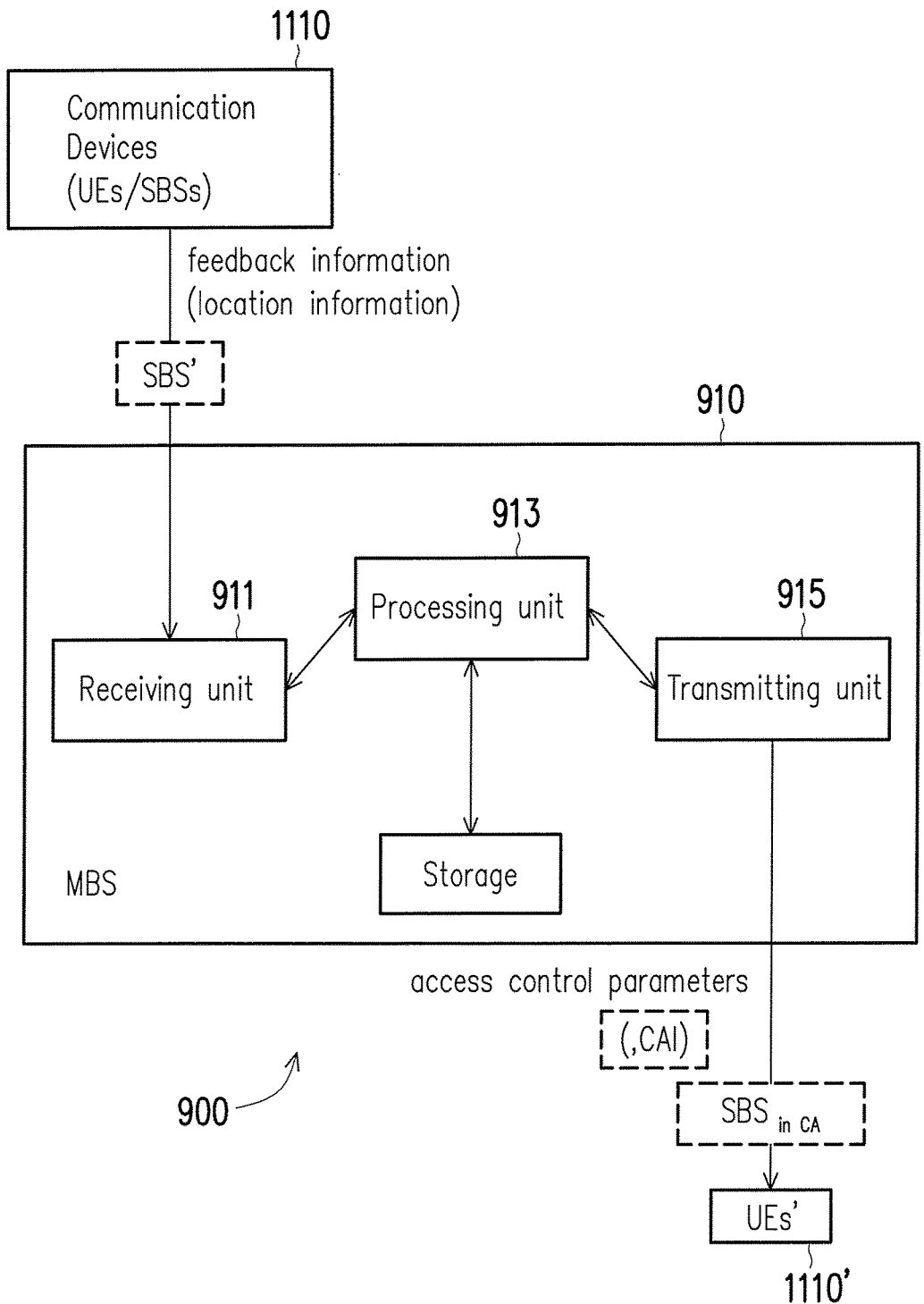
FIG. 9 shows schematic diagram of exemplary embodiments of a system of location information based communication control.

FIG. 9 shows schematic diagram of exemplary embodiments of a system of location information based communication control in a network environment supports direct message transmission in accordance with the disclosed application. The system 900 includes at least a master base station (MBS) 910 which includes at least a receiving unit 911, a processing unit 913, and a transmitting unit 915. The MBS 910 receives a feedback information provide from communication devices (CDs) 1110, e.g. UEs or SBSs, and the MBS 910 performs an access control of a one or more resources based on the feedback information. The MBS 910 transmits one or more control parameters based on the feedback information for having a group of UEs (UEs') 1110' to access the resources based on the control parameters. In some embodiments, the access control parameters may be delivered through a SBS in a control area (CA). In some embodiments, the feedback information may be delivered through another small base station SBS'. And in some other embodiments, the MBS 910 may deliver a CA information (CAI) for having one or more UEs verify whether locate in the CA. The UEs which are located on the CAI, UEs' 1110', may access the resources based on the access control parameters. Otherwise, the UEs could ignore the access control parameters. The following paragraphs describe for various embodiments of the system 900 could also be referred to the FIG. 4-8.

Figure 10:
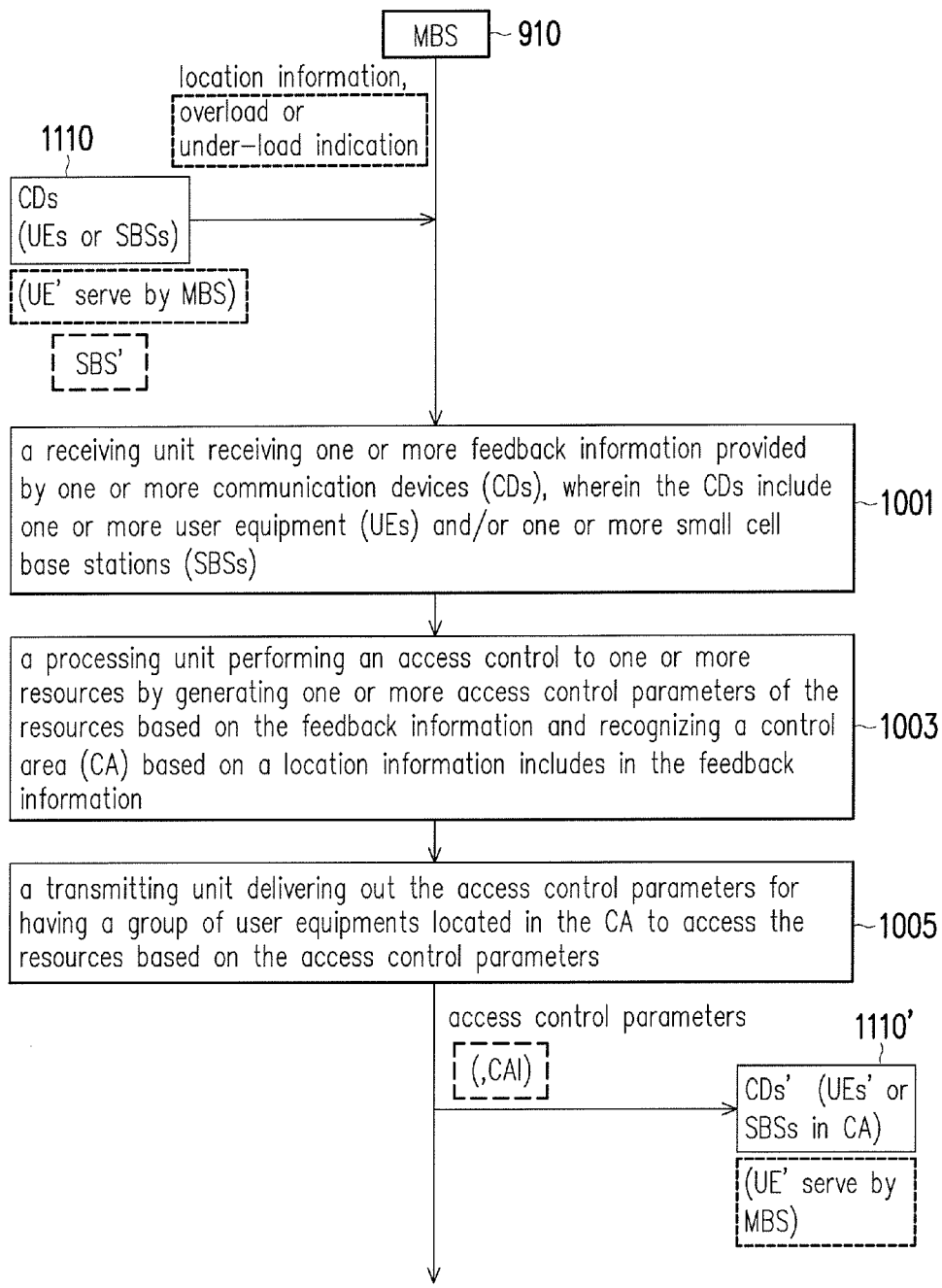
FIG. 10 shows schematic diagram of an exemplary embodiment of MBS in the system of FIG. 9.

An schematic diagram of an exemplary embodiment of MBS 910 in the system 900 of FIG. 9 is shown in the FIG. 10. In block 1001, the receiving unit 911 receives one or more feedback information provide from one or more communication devices (CDs) 1110. The CDs 1110 include one or more user equipment (UEs) or one or more small base stations (SBSs). In block 1003, the processing unit 913 performs an access control to one or more resources by generating one or more access control parameters of the resources bases on the feedback information and recognizing a control area (CA) based on a location information included in the feedback information. In block 1005, the transmitting unit 915 delivers out the one or more access control parameters for having a group of user equipments located in the CA (UEs') 1110' to access the resources based on the access control parameters. In some of the embodiments, the feedback information may be delivered through the help of another small base station SBS', the access control parameters may be delivered through the help of a SBS in a CA, and/or the feedback information may provide from one or more UEs serving by the MBS.

In some embodiments of the system 900, the feedback information may further include an overload or under-load indication of a resource applied for user equipments to deliver message. In some other embodiments of the system 900, the access control parameters may include at least one of one or more back-off parameters of message delivery time, one or more resource allocation parameters, or both of said parameters. And in some embodiments of the system 900, the processing unit 913 of the MBS 910 may perform the access control bases on a comparison of a threshold-O or threshold-U respectively with an aggregating number of the overload or under-load indication within an observation period. In some other embodiments of the system 900, the group of user equipments 1110' may include one or more device-to-device (D2D) user equipments and the CDs 1110 may be D2D user equipments. In some embodiments, the MBS may reuse the resources based on the feedback information from CDs. In some embodiments of the system 900, the transmitting unit 915 of the MBS 910 may further deliver a control area information (CAI) of the recognized CA for having one or more UEs serving by the MBS verify whether locate in the CA based on a comparison of the CAI with own detected location information of the UEs serving by the MBS. And the transmitting unit 915 of the MBS 910 delivers the CAI and the access control parameters to the UEs serving by the MBS.

In some embodiments of the system 900, the location information may include one or more small cell identifications (IDs) detected by the CDs 1110 and the processing unit 913 of the MBS 910 may further decide whether one of the small cell IDs locate in the CA. The CAI includes a small cell ID list that includes the small cell IDs locate in the CA. And in some other embodiments of the system 900, the processing unit 913 of the MBS 910 may decide whether the one of one or more small cell IDs locate in the CA, bases on a comparison of a threshold-R with an aggregating number of the one of the small cell IDs be provided by collecting feedback information from CDs within a time period, to recognize the CA.

In some other embodiments of the system 900, the location information may include one or more global position system (GPS) coordinates, the MBS 910 recognizes the CA based on the GPS coordinates and the CAI includes GPS information of the CA. In some other embodiments of the system 900, the processing unit 913 of the MBS 910 may recognize the CA based on a comparison of a threshold-D with a density of the CDs 1110 in a GPS area defined by the GPS coordinates.

In some embodiments of the system 900, the location information may include one or more reference signal received power (RSRP) values, the MBS 910 may recognize the CA based on a comparison of one or more RSRP-threshold-pairs with the RSRP values and the CAI includes one or more RSRP-threshold-pairs the RSRP values be ranged. In some other embodiments of the system 900, the location information may include one or more resource index, the MBS 910 recognizes the CA based on the resource index and the CAI includes the resource index. All the above-mentioned various pre-defined thresholds may be dynamically decided values, delivered within a communication message dynamically, pre-stored in a storage unit of the MBS 910 or CD 1110, or delivered upon the MBS 910 or CD 1110 connecting to the network and stored in a storage unit of the MBS 910 or CD 1110. Furthermore, the various thresholds mentioned may be provided by a back-end server or by the MBS 910.

In some of the embodiments of the system 900, the overload or under-load indication reports from one or more UEs serving by a SBS respectively, and the location information includes own small cell ID of the SBS serving said UEs, wherein the SBS serving said UEs provide the feedback information to the MBS 910. In some of the other embodiments of the system 900, the one or more feedback information are provided by the SBSs 1110 and the location information includes the SBSs' own small cell ID respectively.

Figure 11:
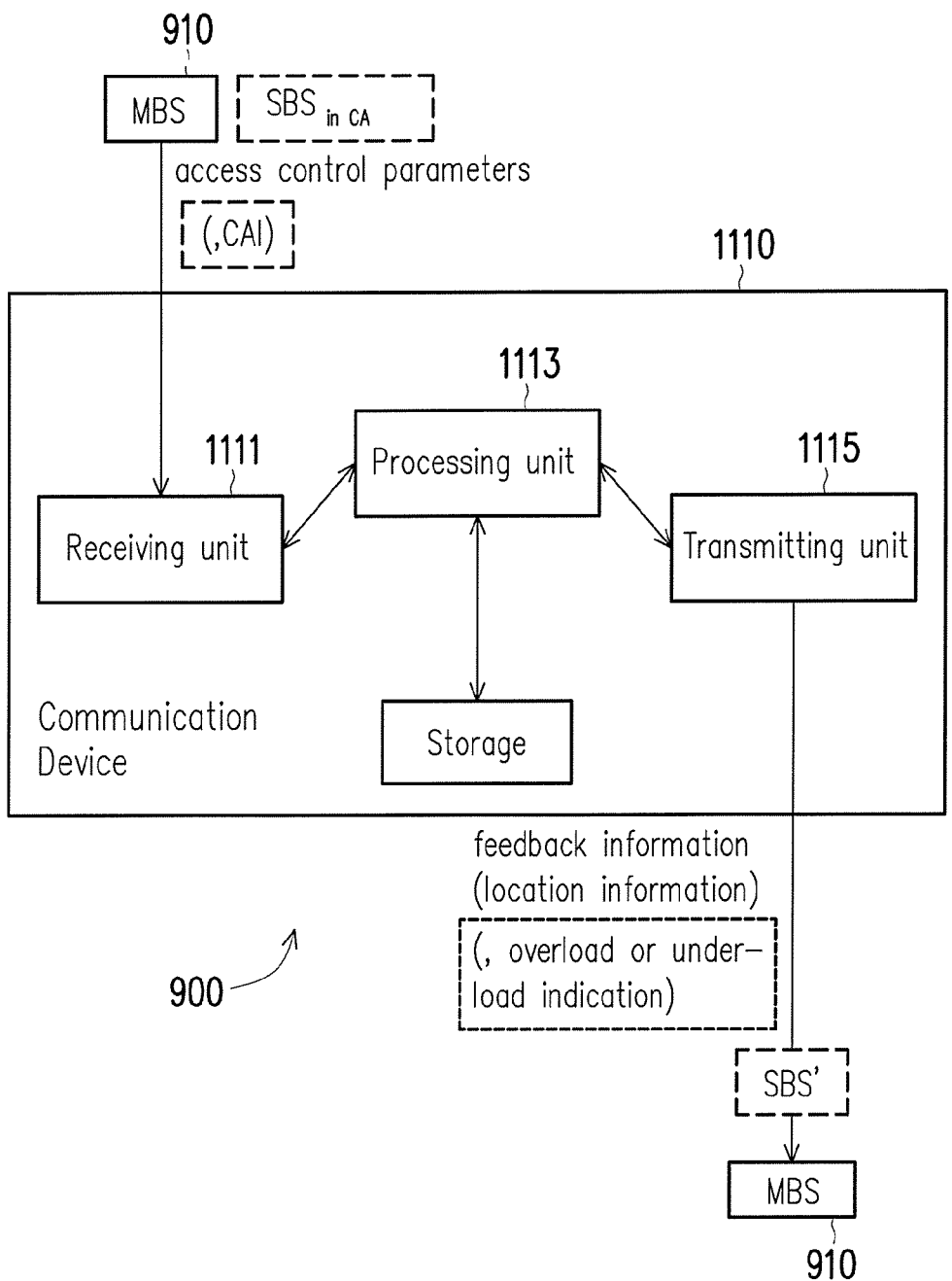
FIG. 11 shows schematic diagram of other exemplary embodiments of the system of location information based communication control of FIG. 9.

FIG. 11 shows schematic diagram of other exemplary embodiments of the system of location information based communication control of FIG. 9. The communication device (CD) 1110 in the system 900 includes at least a receiving unit 1111, a processing unit 1113, and a transmitting unit 1115. The CD 1110 could be a UE or a SBS. The CD 1110 generate one or more feedback information, the feedback information include location information for having a master base station (MBS) 910 recognizes a control area (CA). The CD 1110 transmits the feedback information for having one or more access control parameters of one or more resources be provided for having a group of UEs (UEs') to access the resources based on the control parameters. In an embodiment, the feedback information may include an overload or under-load indication. In some embodiments, the feedback information may be delivered through another small base station SBS'. And in some embodiments, the access control parameters may be provided through a SBS in a CA. In some embodiments of the system 900, a CA information (CAI) may be provided by the MBS 910 for having one or more UEs verify whether locate in the CA. The UEs which are located on the CAI may access the resources based on the access control parameters. Otherwise, the UEs could ignore the access control parameters. The following paragraphs describe for various embodiments of the system 900 could also be referred to FIG. 4-8, with the view of CD 1110.

Figure 12:
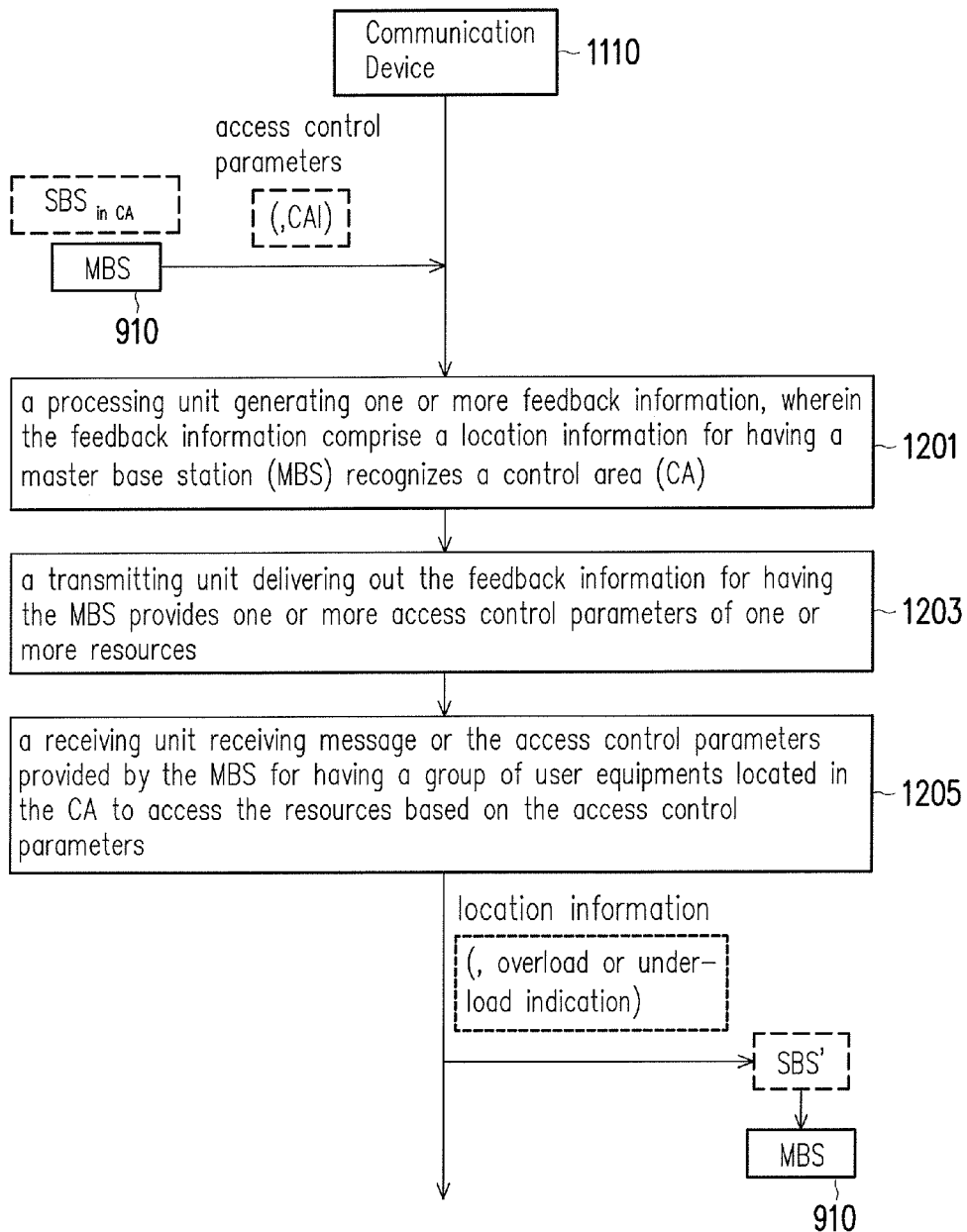
FIG. 12 shows schematic diagram of an exemplary embodiment of communication equipment in the system of FIG. 11.

FIG. 12 shows schematic diagram of an exemplary embodiment of CD 1110 in the system 900 of FIG. 11. In block 1201, the processing unit 1113 generating one or more feedback information and the feedback information include a location information for having a master base station (MBS) recognizes a control area (CA). In block 1203, the transmitting unit 1115 delivering out the feedback information for having the MBS provides one or more access control parameters of one or more resources, and in block 1205 the receiving unit 1111 receives message or the access control parameters provided by the MBS for having a group of user equipments located in the CA to access the resources based on the access control parameters.

In some embodiments of the system 900, the access control parameters include at least one of one or more back-off parameters of message delivery time, one or more resource allocation parameters, or both of said parameters. In some embodiments, the CD 1110 is a device-to-device (D2D) user equipment (UE) serving by the MBS. In some other embodiments, the group of user equipments includes one or more D2D user equipments. In some embodiments, the MBS may reuse the resources based on the feedback information.

In some other embodiments, the location information provide from the CD 1110 may include one or more small cell identifications detected by the processing unit 1113 of the CD 1110, or one or more global position system (GPS) coordinates, or one or more reference signal received power (RSRP), or one or more resource index.

In some of the embodiments, the CD 1110 is a user equipment (UE) serving by the MBS, and the receiving unit 1111 of the UE 1110 receiving the access control parameter with a control area information (CAI) of the CA provides from the MBS 910 to one or more serving user equipments (UEs). And the processing unit 1113 of the UE 1110 verifying whether locate in the CA based on a comparison of the CAI with the UE's own detected location information, and access the resources based on the access control parameter if locate in the CA.

In some of the other embodiments, the CD 1110 is a user equipment (UE) serving by a small base station (SBS) and the UE serving by the SBS provide the overload or under-load indication to the SBS serving the UE, and the location information includes own small cell ID of the SBS serving the UE, and the SBS serving the UE provide the feedback information to the MBS 910. In some embodiments, the transmitting unit 1115 of the CD further delivering out the overload or under-load indication. In some embodiments, the CD 1110 is a user equipment (UE) serving by a small base station (SBS) and the receiving unit 1111 of the UE serving by the SBS receiving the access control parameters from one or more SBSs locate in the CA and access the resources based on the access control parameters to access the resource.

In some embodiments, the CD 1110 is a small base station (SBS) and the location information includes the SBSs' own small cell ID and the receiving unit 1111 of a SBS located in the CA receiving the access control parameters from the MBS 910. In some embodiments, the transmitting unit 1115 of the SBS that locate in the CA delivering the access control parameters to one or more UEs serving by the SBS in the CA for having the UEs follows the access control parameters to access the resource. In some embodiments, the processing unit 1113 of the CD detecting the overload or under-load indication by a comparison of a loading or a decoding error rate of the resource applied for user equipments to deliver message with a threshold-L or threshold-E respectively within an observation period.

Figure 13:
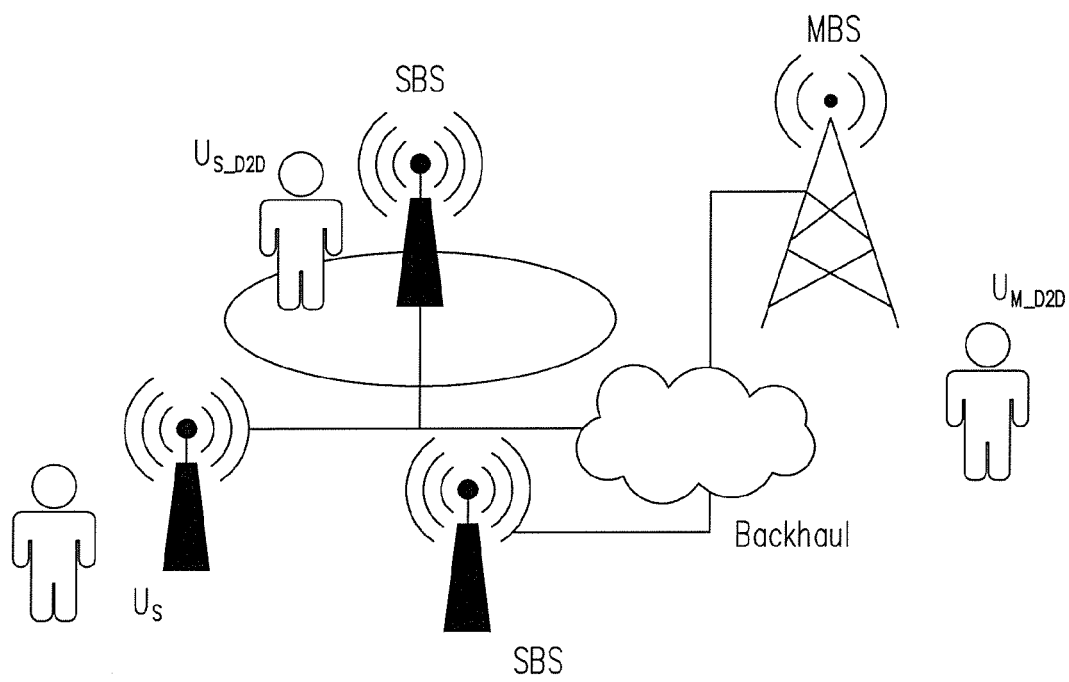
FIG. 13 shows conceptual graph of an exemplary embodiment of a small base station (SBS) network supports direct message transmission.

FIG. 13 shows conceptual graph of an exemplary embodiment of a small base station (SBS) network supports direct message transmission. SBS has backhaul connection with other base stations, SBS and MBS, as shown in FIG. 13. So in some embodiments, the SBS could forward directly or help UEs forward overload/under-load indication to MBS. Moreover, MBS could also apply access control through the help of SBS network. For the convenience of discussion, UE $U_M$ or $U_{M\_D2D}$, $U'_{M\_D2D}$ 1110' is applied to represent the UEs who are served by MBS and Small UE $U_S$ or $U_{S\_D2D}$ to represent the UEs who are served by small base station (SBS), and $U_{M\_D2D}$, $U_{S\_D2D}$ represents is a D2D UE. In the application, the $U_M$ and $U_{M\_D2D}$ are interchangeable and so does the $U_S$ and $U_{S\_D2D}$, which is using for demonstration purpose only. In this disclosure, we will disclose exemplary embodiments to express how access control is realized through the help of MBS and/or SBS.

Figure 14:
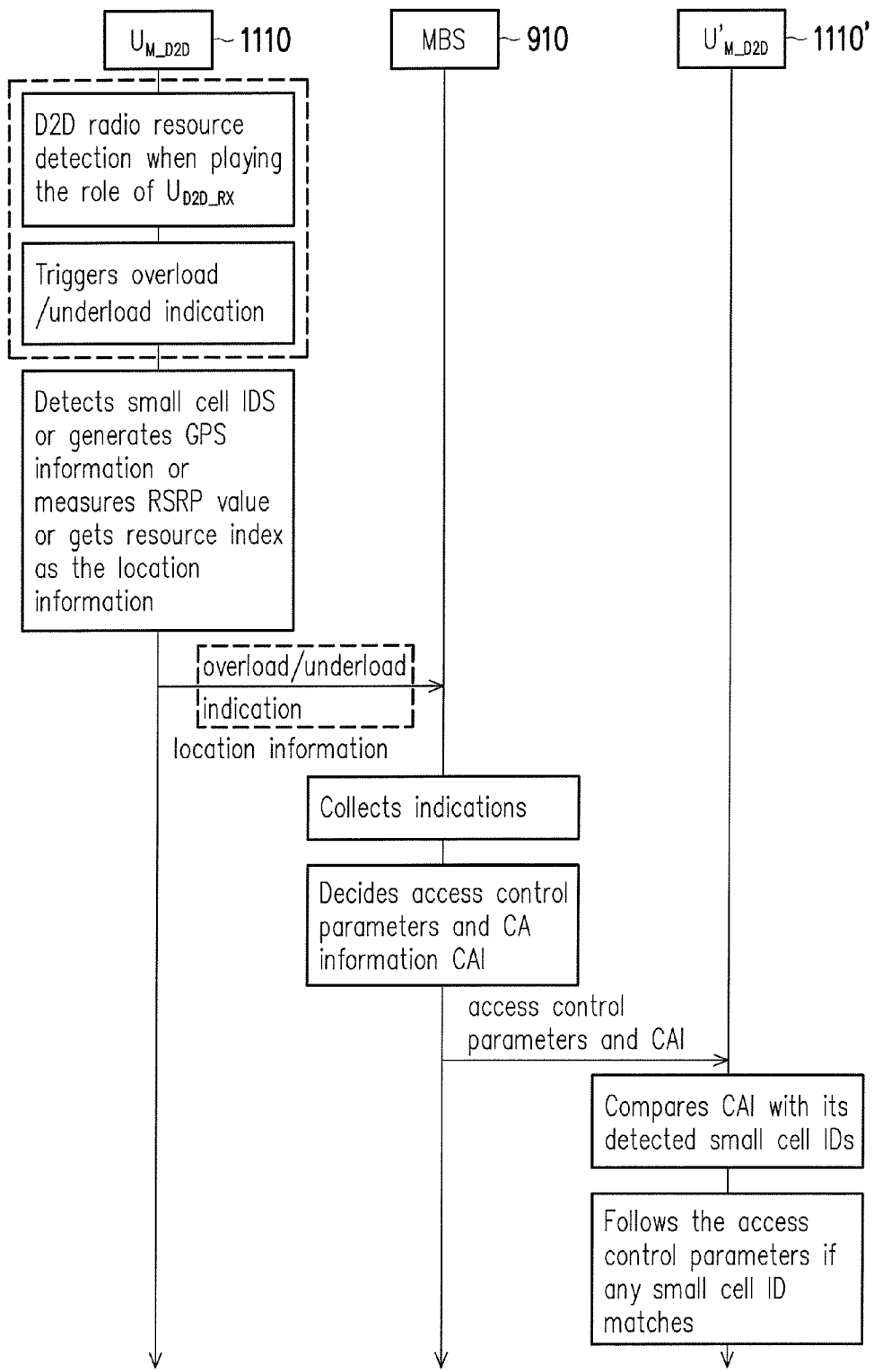
FIG. 14 shows an exemplary embodiment of a system of location information based communication control.

An exemplary embodiment of a system of location information based communication control shows in FIG. 14. As shows in FIG. 14, which discloses the progress for MBS to realize access control through the help of UE supports D2D. In other similar embodiment, it could also be implemented by UE which not supports D2D. Progress graph of FIG. 14 is plotted to show the individual behavior and interactions between each entity, which includes $U_{M\_D2D}$ 1110, MBS 910, and $U'_{M\_D2D}$ 1110'.

Location information could be attached in the feedback information when the CD detects a local congestion (overload) or udder-utilization (under-load) of a resource applied for user equipments to deliver message. In an embodiment of FIG. 14, $U_{M\_D2D}$ 1110 may send the small cell ID list which they detect in their neighborhoods and the small cell ID list includes the SBS's ID serving them also. So, MBS 910 could notice the location of the local congestion after receiving the small cell ID list. In another embodiment, $U_{M\_D2D}$ 1110 may report its GPS coordinates. In an example, MBS 910 may also apply spatial reuse to the resources, for example extended Tx pool etc., to other cellular UEs based on the location information be provided. MBS 910 will also decide the CAI By collecting multiple GPS coordinates from UEs as shows in FIG. 5.

In another embodiment, $U_{M\_D2D}$ 1110 may report the measured Reference Signal Received Power (RSRP) as the location information to MBS 910. $U_{M\_D2D}$ 1110 could obtain the RSRP by measuring the reference signals broadcasting from the MBS 910. MBS 910 will also decide the CAT By collecting multiple GPS coordinates from UEs as shows in FIG. 7. In other embodiment, MBS 910 may decide to reuse the radio resources based on measurements of $U_{M\_D2D}$ 1110 to the resource pool, and provide resource index directly as the location information.

In an exemplary embodiment, CDs 1110 may also provide overload or under-load indications for MBS 910 to adjust access control parameters. In an embodiment of FIG. 14, $U_{M\_D2D}$ includes Connected UEs and idle UEs which are accessing the radio resource pool. Among these UEs, $U_{M\_D2D}$ could estimate the Tx/Rx resource pool when the UE is playing the role of $U_{RX}$.

In an exemplary embodiment in accordance with the application, may provide two indicators, $\eta_L$ and $\eta_D$ for CD 1110 to make decision whether to trigger the transmission of overload indication. As shown in Equation (1) and (2) respectively, $\eta_L$ represents the loading of resources and $\eta_D$ represents the decoding error rate of the resources.

$$\text{Loading of resource pool } (\eta_L) \equiv \frac{N_{occupied}}{N_{Total}} \tag{1}$$

$$\text{Decoding Error Rate } (\eta_D) \equiv \frac{N_{Decode\ Error}}{N_{occupied}} \tag{2}$$

$N_{total}$=Number of resource block (RB) in the Tx pool.
$N_{occupied}$=Number of RB which are occupied.

$N_{Decode\_Error}$=Number of RB which are decoded error in the Tx pool

CD 1110 could trigger the transmission of overload indication if it detects $\eta_L > T_U$ and $\eta_D > D_U$, which represents overload condition, when it is at the Rx stage and $T_U$, $D_U$ is pre-defined threshold-L, threshold-E respectively. In an embodiment, CD 1110 could inform MBS 910 the overload indication by providing 1 bit in the feedback information.

When the local congestion happens, MBS 910 may receive multiple overload indications of radio resource from different CDs 1110. In an exemplary embodiment, MBS 910 could decide when to trigger the access control of one or more resources by calculating the number of related overload indications during an observation period. For example, MBS 910 may start an observation period when receiving the first overload indication from one CD 1110. Take small cell ID as an example, the first overload indication contains one small cell ID '00001111'. MBS 910 may record how many overload indications with small cell ID '00001111' are received during the observation period. Here, we define $N_O$ (small cell ID) as the number of overload indications to every specific small cell ID. MBS 910 may trigger access control to the small cell, which has the small cell ID '00001111', if $N_O$ (00001111)>$T_O$ before the end of the observation period. Here, threshold-O $T_O$ could be a pre-defined threshold or be dynamically decided value. When the access control is triggered, the MBS 910 may deliver the access control parameters, which may be the back-off parameters and/or access resource allocation. MBS 910 may also provide the CA Information (CAI) to indicate the CA. In this embodiment, MBS 910 will inset the small cell ID '00001111' into the CA information.

In an embodiment, MBS 910 may also provide access resource allocation to the group of UEs locate in the CA, as shown in FIG. 7. MBS may also apply spatial reuse to the extended Tx pool to other cellular UEs. We could assume the cellular UE has an uplink connection with MBS and we disclose two embodiments for MBS 910 to find out the opportunities for spatial reuse to the extended Tx pool.

In an embodiment, MBS 910 may find out the opportunities for spatial reuse of radio resources based on GPS coordinates provide from CDs 1110. MBS 910 may allocate the extended Tx pool to a UE which is far away from the CA to deliver uplink data. Based on the GPS coordinate, MBS 910 may also not assign the extended Tx pool to a UE which is close to the CA.

In another embodiment, MBS 910 may decide to reuse the radio resources based on CDs' measurements to the extended Tx pool. First, MBS may allocate the whole extended Tx pool to one uplink UE directly. Interference could be noticed, when some UEs of $U_{M\_D2D}$ are close to the uplink UE during their $U_{RX}$ stage, for example of the embodiment of FIG. 14. So, those UEs will notice the whole extended Tx pool is congested because those UEs can't decode the whole extended Tx pool successfully and it is clear that the overload condition only happens to the extended Tx pool. So, those congested UEs may provide an 'overload indication only to extended Tx pool' by themselves or through the help of SBSs. After receiving these 'overload indication only to extended Tx pool', MBS 910 may re-assign the extended Tx pool to other UEs.

MBS 910 delivers the access control parameters and CAI through broadcasting or dedicated signals. Therefore, in FIG. 14 we define the $U_{M\_D2D}$ 1110 and $U_{M\_D2D}$ 1110' to represent the possibility of different groups of UEs. $U'_{M\_D2D}$ 1110' represents the group of UEs which receive the access control parameters and CAI. After receiving the access control parameters, $U'_{M\_D2D}$ 1110' will verify the CAI to decide whether it is located in the CA and to follow the access control parameters to access the resource. As shown in Table 1, $U'_{M\_D2D}$ 1110' will compare the CAI with the small cell ID list which it observes currently. $U'_{M\_D2D}$ 1110' will follow the access control parameters to access the resources if it detects any small cell ID in the CAI. Otherwise, $U_{M\_D2D}$ 1110' will ignore the access control parameters.

TABLE 1

| CAI | small cell ID detected by $U'_{M\_D2D}$ | Small cell ID matching ? |
|---|---|---|
| 00000011 | 00000010 | No |
| 00001111 | 00001111 | Yes, UE should follow the access control parameters |
| 00111111 | 00111110 | No |
| 01111111 | X | No |
| 11111111 | X | No |

In an embodiment, CDs 1110 could also provide under-load indications for MBS 910 to adjust access control parameters. In the local under-load condition, MBS may shorten the back-off parameters or shrink the Tx radio resource or extended Tx pool. The under-load condition may be defined by CD 1110 detecting $\eta_L < T_L$ and $\eta_D < D_L$ when they are $U_{RX}$. As shows in FIG. 14, when $U_{M\_D2D}$ 1110 realizes the under-load condition, $U_{M\_D2D}$ 1110 could send a under-load indication to MBS 910. In an embodiment, the overload indication and under-load indication may be distinguished By 1 control bit in the feedback information. For example in an embodiment, the control bit is set to '1' to represent the overload condition and set to '0' to represent the under-load condition. Same with the overload condition, take small ID as location information as an example, CE1110 could also provide the detected small cell IDs with the under-load indication to MBS 910. After receiving under-load condition provided by CDs 1110, MBS 910 could record the $N_U$(small cell ID). Here, we define $N_U$ (small cell ID) as the number of under-load indications to every specific small cell ID. MBS 910 may update the access control parameters and CAI when $N_U$ (small cell ID)>$T_U$. Here, $T_U$ (threshold-U) could be a predefined threshold or be dynamically decided value. As shows in FIG. 14, after MBS 910 delivering the updated access control parameters and CAI to $U'_{M\_D2D}$ 1110' through broadcasting or dedicated signals, $U'_{M\_D2D}$ 1110' could decide whether to follow the access control parameters to access the resources by verifying the CAI.

Figure 15:
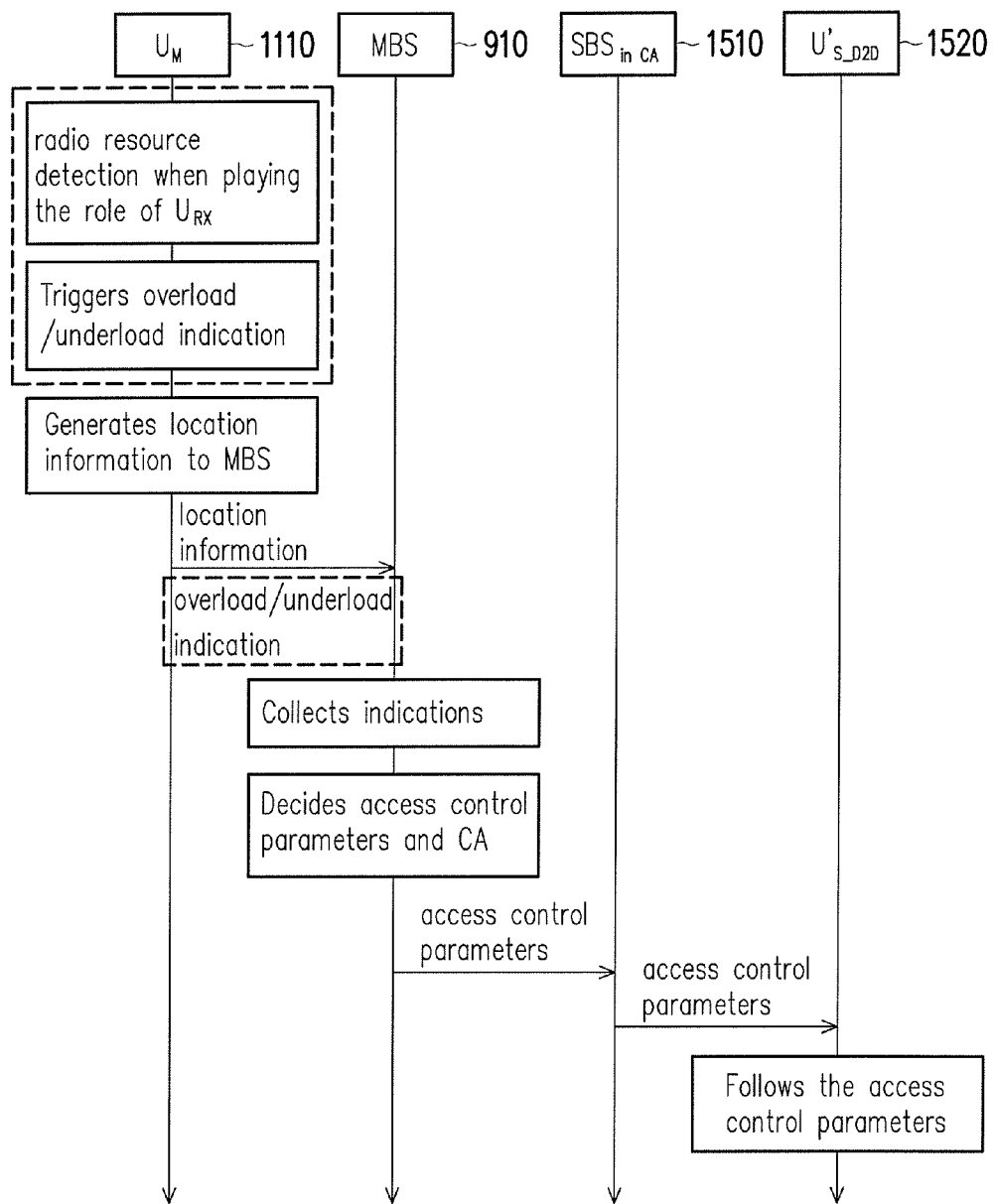
FIG. 15, 16, 17 shows more exemplary embodiments of a system of location information based communication control.

FIG. 15, 16, 17 shows other exemplary embodiments of a system of location information based communication control. CD 1110 may provide location information for MBS 910 to decide SBSs in CA. In these exemplary embodiments, we assume MBS may obtain the location information of every SBS under its coverage through the help of backhaul network or SBS itself.

The progress graph of an embodiment is plotted in FIG. 15. $U_M$ 1110 will provide location information, and in some embodiments also with overload/under-load indication, to MBS 910. The location information could be presented by UE's GPS coordinates or detected small cell ID list etc., for example. The decision rules for $U_M$ 1110 to trigger the overload/under-load indication may be the same with the rules describe in FIG. 14.

MBS 910 will decide the access control parameters and CA based on reports from all of the $U_M$s 1110. The decision rules may be the same with the decision rules describe in FIG. 14. After deciding the CA, MBS 910 will select the SBS 1510 located on the CA based on the GPS coordinates or small cell ID of SBSs 1510 etc., for example. MBS 910 will deliver the access control parameters to selected SBSs 1610 through backhaul connections. SBSs in the CA 1510 will deliver the access control parameters to U'$_{S\_D2D}$ 1520 through broadcasting or dedicated signaling. In this embodiment, U'$_{S\_D2D}$ 1520 will access the resources based on the access control parameters directly after receiving the access control parameters from SBS in CA 1510.

Figure 16:
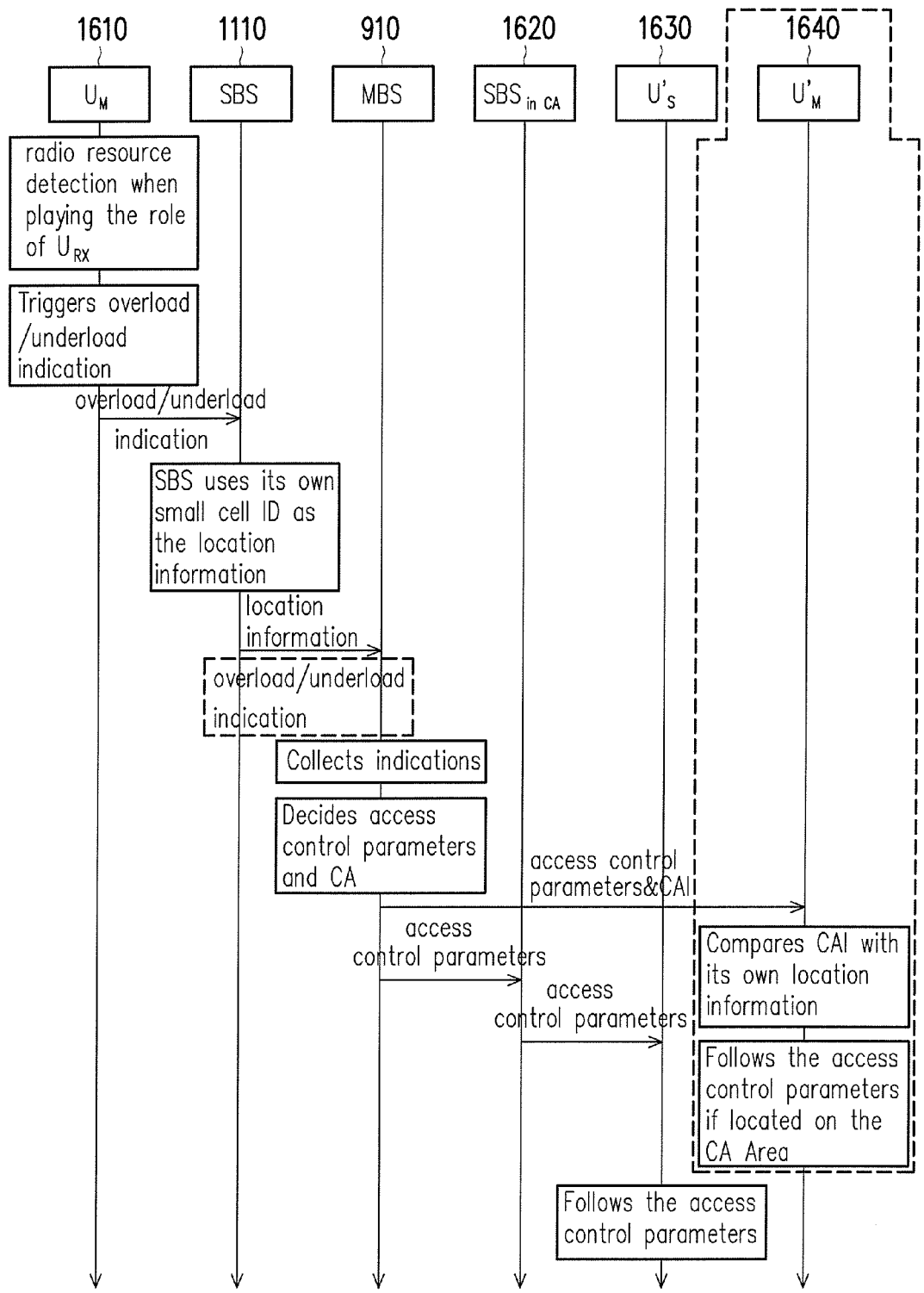

Small base station (SBS) may facilitate the access control because SBS has backhaul connection with MBS. In FIG. 16, we have plotted the progress group of exemplary embodiments which SBS could help UEs report the location information, in some embodiments also with overload/under-load indication, to MBS. In an embodiment, U$_S$ 1610 will provide 1 bit overload/under-load indication to SBS 1110. SBS 1110 will forward the overload/under-load indication with its own small cell ID to MBS 910 through the backhaul. The decision rules of U$_S$ 1610 providing the 1 bit overload/under-load indication may be the same with the rules describe in FIG. 14.

MBS 910 will collect the overload/under-load indications and location information through the backhaul connection. After receiving the overload/under-load indication, MBS 910 will decide whether to trigger the access control. The decision rules for MBS 910 to trigger the access control may be the same with the rules describe in FIG. 14.

SBS could help MBS deliver the access control parameters. In an embodiment, MBS 910 will decide the access control parameters and CAI based on the same rules of describe in FIG. 14. However, in an embodiment, MBS 910 does not broadcast the access control parameters or with CAI in the air links. Instead, MBS 910 may deliver the access control parameters to SBSs 1620 located on the CAI through backhaul connection. SBSs 1620 which receive the access control parameters will forward the parameters to U'$_S$ 1730 through broadcasting or dedicated signals.

In this embodiments, U'$_S$ 1630 will follow the access control parameters to access the resources directly after receiving the access control parameters from SBS in CA 1620. An additional step as shows in FIG. 16, which the MBS 910 will also deliver the access control parameters with the CAI to UEs (U$_M$)) 1640. In an embodiment, CAI could be formulated by the list of small cell IDs in the CA etc., for example. After receiving the access control parameters and CAI, U'$_M$ 1640 will compare the CAI with the small cell ID list which it observes currently. U$_M$ 1640 will follow the access control parameters to access the resources if it detects any small cell ID in the CAI. Otherwise, U'$_M$ 1640 will ignore the access control parameters.

Figure 17:
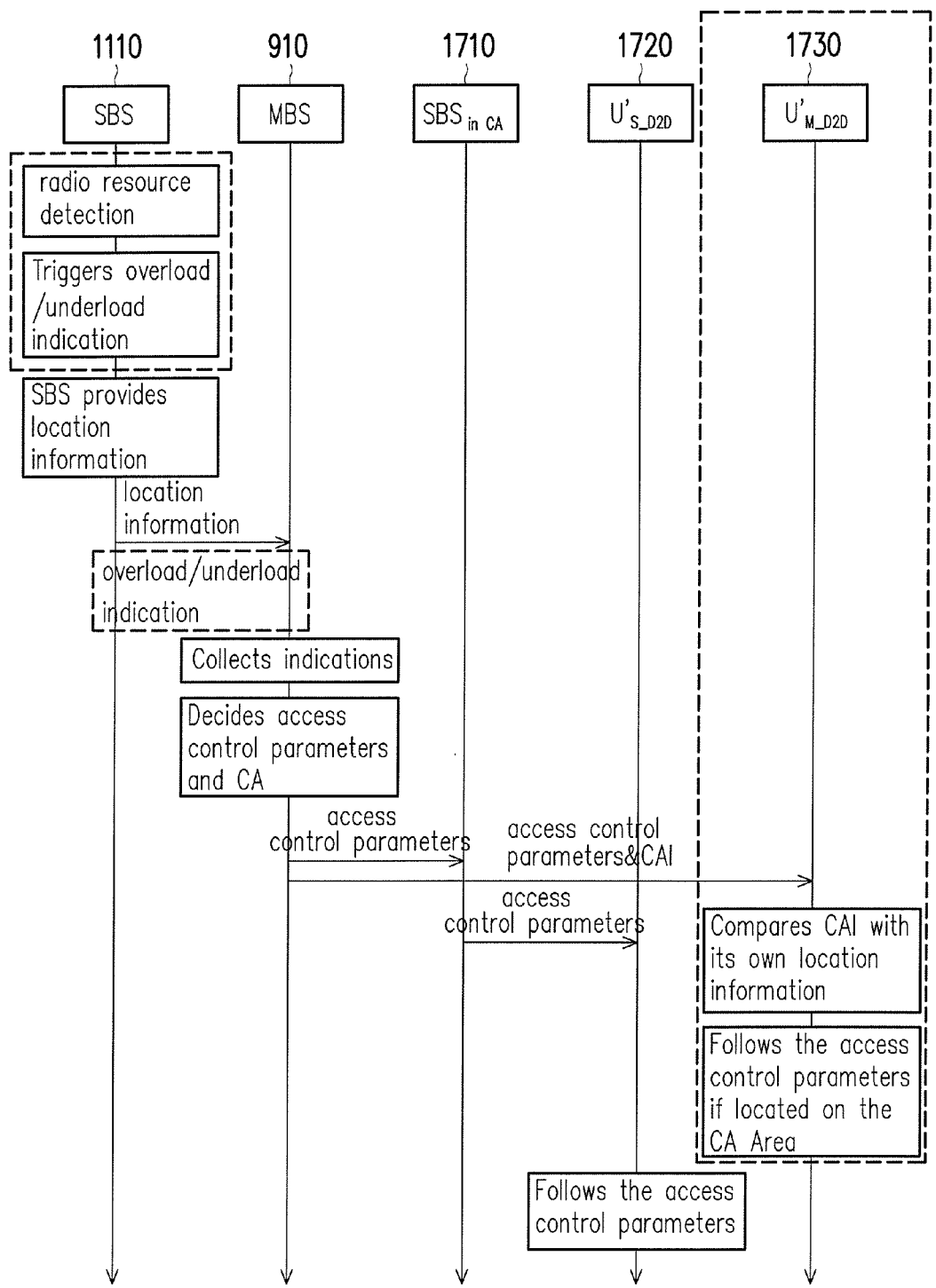

The process graph of exemplary embodiments of a location information based communication control system in accordance with the application is shown on FIG. 17. In the embodiments, SBS 1110 will monitor the radio resource, which is allocated by MBS 910 for message delivery, to detect the overload/under-load condition. SBS 1110 may obtain the configuration of resource from MBS 910 through backhaul, or air link signaling.

SBS 1110 may notice the overload/under-load condition by detecting the given resource. The SBS 1110 may be required by MBS 910 to detect radio resource or SBS 1110 may keep monitoring the radio resource pool regularly. It is also possible that MBS 910 requires SBS 1110 to detect the radio resource when it receives overload/under-load indication from UEs. The decision rules for SBS 1110 to trigger the overload/under-load indication may be the same with the rules for UE to trigger the overload/under-load indication describe in FIG. 14. MBS 910 will collect the overload/under-load indications from one or more than one SBS 1110. Then, MBS 910 could decide whether to trigger access control. The decision rules to trigger access control may be the same with the decision rules describe in FIG. 14.

After triggering the access control, MBS 910 will deliver the access control parameters to SBSs in CA 1710. In an embodiment, CAI could be formulated by the list of small cell IDs in the CA. Those SBSs in CA 1710 will deliver the access control parameters to U'$_S$ 1720 through broadcasting or dedicated signal. In this embodiment, U'$_S$ 1720 will follow the access control parameters to access the resources directly after receiving the access control parameters from SBS 1110.

As shown in FIG. 17, an additional process, which the MBS 910 may also deliver the access control parameters with the CAI to UEs (U'$_{M\_D2D}$) 1730. In an embodiment, SBS 1110 will provide location information, which may be GPS coordinates or the small cell ID of itself etc., for example, in some embodiments also with the overload/under-load indication to the MBS 910. So, after MBS 910 triggering the access control, the CAI may be formulated by GPS information about the CA or a small cell ID list etc. MBS 910 will deliver the access control parameters and CAI to all U'$_{M\_D2D}$ 1730 by broadcasting or dedicated signaling. After receiving the access control parameters and CAI, U'$_{M\_D2D}$ 1730 will decide whether to follow the access control parameters to access the resources by comparing the CAI with its own detected location information.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of location information based communication control, comprising:
    performing an access control to one or more resources by a master base station (MBS) generating one or more access control parameters of the resources based on one or more feedback information provided by one or more communication devices (CDs), wherein the CDs include one or more user equipments (UEs) and/or one or more small base stations (SBSs), and each of the feedback information is associated with an overload or under-load status of a resource applied for the user equipments to transmit;
    recognizing a control area (CA) by the MBS based on a location information included in the feedback information, wherein the location information comprises one or more reference signal received power (RSRP) values and the MBS recognizes the CA based on a comparison of one or more RSRP threshold-pairs with the RSRP values; and
    delivering out by the MBS the one or more access control parameters for having a group of user equipments located in the CA to access the resources based on the access control parameters.

2. The method of location information based communication control of claim 1, wherein the access control parameters comprise at least one of one or more back-off parameters of message delivery time, one or more resource allocation parameters, or both of said parameters.

3. The method of location information based communication control of claim 1, wherein the feedback information further comprise an overload or under-load indication of the resource applied for the user equipments to deliver,
wherein the MBS performs the access control based on a comparison of an overload threshold-O or under-load threshold-U respectively with an aggregating number of the overload or under-load indications within an observation period.

4. The method of location information based communication control of claim 1, wherein the group of user equipments comprises one or more device-to-device (D2D) user equipments and the CDs are D2D user equipments,
wherein the MBS reuses the resources based on the feedback information.

5. The method of location information based communication control of claim 1, further comprising:
delivering by the MBS a control area information (CAI) of the recognized CA for having one or more UEs served by the MBS verify whether the UEs served by the MBS is located in the CA based on a comparison of the CAI with its own detected location information of the UEs served by the MBS,
wherein the MBS delivering the CAI and the access control parameters to the UEs served by the MBS.

6. The method of location information based communication control of claim 5, further comprises:
deciding by the MBS whether one of one or more small cells correspond to one or more small cell identifications (IDs) which are located in the CA and the CAI includes a small cell ID list that includes the small cell IDs to which the small cells located in the CA correspond, wherein the location information includes the small cell IDs detected by the CDs.

7. The method of location information based communication control of claim 5, wherein the location information comprises one or more global position system (GPS) coordinates and the CAI includes a GPS information of the CA,
wherein the GPS information comprises at least one of a radius with one of the GPS coordinates as origin to represent a circular area, or a plurality of the GPS coordinates as vertices to represent a polygon.

8. The method of location information based communication control of claim 5, wherein the location information comprises one or more reference signal received power (RSRP) values and the MBS recognizes the CA based on a comparison of one or more RSRP-threshold-pairs with the RSRP values,
wherein the CAI comprises one or more RSRP-threshold-pairs, and each of the RSRP-threshold-pairs ranges a RSRP value.

9. The method of location information based communication control of claim 5, wherein the location information comprises one or more resource index and the MBS recognizes the CA based on the resource index, wherein the CAI comprises the resource index.

10. The method of location information based communication control of claim 1, further comprises:
deciding by the MBS whether one of one or more cells correspond to one or more small cell identifications (IDs) which are located in the CA, wherein the location information includes the small cell IDs detected by the CDs,
wherein the MBS decides whether the one of the small cells are located in the CA based on a comparison of a threshold-R with an aggregating number of the one of the small cell IDs provided within a time period, to recognize the CA.

11. The method of location information based communication control of claim 1, wherein the location information comprises one or more global position system (GPS) coordinates and the MBS recognizes the CA based on the GPS coordinates.

12. The method of location information based communication control of claim 1, wherein the location information comprises one or more resource index and the MBS recognizes the CA based on the resource index.

13. The method of location information based communication control of claim 1, wherein the feedback information further comprise an overload or under-load indication of the resource applied for the user equipments to deliver, and the feedback information are provided by the UEs served by the MBS.

14. The method of location information based communication control of claim 1, further comprises:
deciding by the MBS whether one of one or more small cells correspond to one or more small cell identifications (IDs) which are located in the CA,
wherein the MBS delivering the access control parameters to one or more SBSs located in the CA, for having one or more SBSs located in the CA deliver the access control parameters to one or more UEs served by the SBSs located in the CA for having the UEs served by the SBSs located in the CA to access the resources based on the access control parameters.

15. The method location information based of communication control of claim 14, wherein the feedback information further comprise an overload or under-load indication of the resource applied for the user equipments to deliver, and the feedback information are provided by one or more UEs served by the MBS.

16. The method of location information based communication control of claim 14, wherein the feedback information further comprise an overload or under-load indication of the resource applied for the user equipments to deliver, and the overload or under-load indication reports from one or more UEs served by a SBS respectively, and the location information includes own small cell ID of the SBS served said UEs, wherein the SBSs serving said UEs provide the feedback information to the MBS.

17. The method of location information based communication control of claim 14, wherein the feedback information further comprise an overload or under-load indication of the resource applied for the user equipments to deliver, and the feedback information are provided by the SBSs and the location information comprises the SBSs' own small cell ID respectively.

18. A system of location information based communication control comprising:
a master base station (MBS) comprising:
a receiving unit receiving one or more feedback information provided by one or more communication devices (CDs), wherein the CDs include one or more user equipment (UEs) and/or one or more small base stations (SBSs), and each of the feedback information is associated with an overload or under-load status of a resource applied for the user equipments to transmit;
a processing unit performing an access control to one or more resources by generating one or more access control parameters of the resources based on the feedback information and recognizing a control area (CA) based on a location information included in the feedback information, wherein the location information comprises one or more reference signal received power (RSRP) values and the processing unit of the MBS recognizes the CA based on a comparison of one or more RSRP-threshold-pairs with the RSRP values; and a transmitting unit delivering out the one or more access control parameters for having a group of user equipments located in the CA to access the resources based on the access control parameters.

19. The system of location information based communication control of claim 18, wherein the access control parameters comprise at least one of one or more back-off parameters of message delivery time, one or more resource allocation parameters, or both of said parameters.

20. The system of location information based communication control of claim 18, wherein the feedback information comprise an overload or under-load indication of the resource applied for user equipments to deliver,
wherein the processing unit of the MBS performs the access control based on a comparison of an overload threshold-O or under-load threshold-U respectively with an aggregating number of the overload or under-load indications within an observation period.

21. The system of location information based communication control of claim 18, wherein the group of user equipments comprises one or more device-to-device (D2D) user equipments and the CDs are D2D user equipments, wherein the MBS reuses the resources based on the feedback information.

22. The system of location information based communication control of claim 18, wherein the transmitting unit of the MBS further delivering a control area information (CAI) of the recognized CA for having one or more UEs served by the MBS verify whether the UEs served by the MBS which is located in the CA based on a comparison of the CAI with own detected location information of the UEs serving by the MBS,
wherein the transmitting unit of the MBS delivers the CAI and the access control parameters to the UEs served by the MBS.

23. The system of location information based communication control of claim 22, wherein the location information includes one or more small cell identifications (IDs) detected by the CDs and the processing unit of the MBS further deciding whether one of the small cell IDs which is located in the CA,
wherein the CAI comprises a small cell ID list that includes the small cell IDs to which one or more small cells located in the CA correspond.

24. The system of location information based communication control of claim 22, wherein the location information comprises one or more global position system (GPS) coordinates and the CAI includes a GPS information of the CA,
wherein the GPS information of the CA comprises at least one of a radius with one of the GPS coordinates as origin to represent a circular area, or a plurality of the GPS coordinates as vertices to represent a polygon.

25. The system of location information based communication control of claim 22, wherein the location information comprises one or more reference signal received power (RSRP) values,
wherein the MBS recognizes the CA based on a comparison of one or more RSRP-threshold-pairs with the RSRP values, the CAI comprises one or more RSRP-threshold-pairs, and each of the RSRP-threshold-pairs ranges a RSRP value.

26. The system of location information based communication control of claim 22, wherein the location information comprises one or more resource index,
wherein the processing unit of the MBS recognizes the CA based on the resource index and the CAI comprises the resource index.

27. The system of location information based communication control of claim 18, wherein the location information includes one or more small cell identifications (IDs) detected by the CDs and the processing unit of the MBS further deciding whether a small cell corresponds to one of the small cell IDs which is located in the CA,
wherein the processing unit of the MBS decides whether one of one or more small cells correspond to the one or more small cell IDs which are located in the CA, based on a comparison of a threshold-R with an aggregating number of the one of the small cell IDs provided within a time period, to recognize the CA.

28. The system of location information based communication control of claim 18, wherein the location information comprises one or more global position system (GPS) coordinates and the MBS recognizes the CA based on the GPS coordinates.

29. The system of location information based communication control of claim 18, wherein the location information comprises one or more resource index and the processing unit of MBS recognizes the CA based on the resource index.

30. The system of location information based communication control of claim 18, wherein the feedback information further comprise an overload or under-load indication of the resource applied for user equipments to deliver, and the feedback information are provided by the UEs served by the MBS.

31. The system of location information based communication control of claim 18, wherein the processing unit of the MBS further deciding whether one of one or more small cells correspond to one or more small cell identifications (IDs) which are located in the CA,
wherein the transmitting unit of the MBS further delivering the access control parameters to one or more SBSs located in the CA, for having the SBSs located in the CA deliver the access control parameters to one or more UEs served by the SBSs located in the CA for having the UEs served by the SBSs located in the CA to access the resources based on the access control parameters.

32. The system of location information based communication control of claim 31, wherein the feedback information further comprise an overload or under-load indication of the resource applied for user equipments to deliver, and the feedback information are provided by one or more UEs served by the MBS.

33. The system of location information based communication control of claim 31, wherein the feedback information further comprise an overload or under-load indication of the resource applied for user equipments to deliver, and the overload or under-load indication reports from one or more UEs serving by a SBS respectively, and the location information includes own small cell ID of the SBS served said UEs,
wherein the SBS served said UEs provide the feedback information to the MBS.

34. The system of location information based communication control of claim 31, wherein the feedback information further comprise an overload or under-load indication of the resource applied for user equipments to deliver, and the feedback information are provided by the SBSs and the location information comprises the SBSs' own small cell ID respectively.

35. A system of location information based communication control comprising:
   a communication device (CD) comprising:
   a processing unit generating one or more feedback information, wherein the feedback information comprise a location information comprising a reference signal received power (RSRP) value for having a master base station (MBS) recognizes a control area (CA) based on a comparison of one or more RSRP-threshold-pairs with the RSRP values, wherein each of the feedback information is associated with an overload or under-load status of a resource applied for user equipments to transmit;
   a transmitting unit delivering out the feedback information for having the MBS provides one or more access control parameters of one or more resources; and
   a receiving unit receiving message, or the access control parameters provided by the MBS for having a group of user equipments located in the CA to access the resources based on the access control parameters in response to delivering out the feedback information.

36. The system of location information based communication control of claim 35, wherein the access control parameters comprise at least one of one or more back-off parameters of message delivery time, one or more resource allocation parameters, or both of said parameters.

37. The system of location information based communication control of claim 36, wherein the processing unit of the CD detecting the overload or under-load indication by a comparison of a loading or a decoding error rate of the resource applied for user equipments to deliver with a loading threshold-L or decoding error rate threshold-E respectively within an observation period.

38. The system of location information based communication control of claim 35, wherein the CD is a device-to-device (D2D) user equipment served by the MBS,
   wherein the MBS reuses the resources based on the feedback information.

39. The system of location information based communication control of claim 38, wherein the group of user equipments comprises one or more D2D user equipments.

40. The system of location information based communication control of claim 35, wherein the location information comprises one or more small cell identifications detected by the processing unit of the CE, or one or more global position system (GPS) coordinates, or one or more reference signal received power (RSRP), or one or more resource index.

41. The system of location information based communication control of claim 35, wherein the CD is a user equipment (UE) served by the MBS, and the receiving unit of the UE receiving the access control parameters with a control area information (CAI) of the CA, wherein the CAI is provided by the MBS to one or more served user equipments (UEs),
   wherein the processing unit of the UE verifying whether the UE is located in the CA based on a comparison of the CAI with the UE's own detected location information, and accessing the resources based on the access control parameters when located in the CA.

42. The system of location information based communication control of claim 35, wherein the CD is a user equipment (UE) served by a small base station (SBS) and the UE served by the SBS provides the overload or under-load indication to the SBS serving the UE,
   wherein the location information comprises own small cell ID of the SBS serving the UE and the SBS serving the UE provides the feedback information to the MBS.

43. The system of location information based communication control of claim 35, wherein the CD is a user equipment (UE) served by a small base station (SBS) and the receiving unit of the UE served by the SBS receiving the access control parameters from one or more SBSs located in the CA and following the access control parameters to access the resource.

44. The system of location information based communication control of claim 43, wherein the transmitting unit of the SBS that located in the CA delivering the access control parameters to one or more UEs served by the SBS located in the CA for having the UEs follows the access control parameters to access the resource.

45. The system of location information based communication control of claim 35, wherein the CD is a small base station (SBS) and the location information includes the SBSs' own small cell ID and the receiving unit of the SBS that located in the CA receiving the access control parameters from the MBS.

46. A method of location information based communication control, comprising:
   performing an access control to one or more resources by a master base station (MBS) generating one or more access control parameters of the resources based on one or more feedback information provided by one or more communication devices (CDs), wherein the CDs include one or more user equipments (UEs) and/or one or more small base stations (SBSs), and each of the feedback information s associated with an overload or under-load status of a resource applied for the user equipments to transmit;
   recognizing a control area (CA) by the MBS based on a location information included in the feedback information, wherein the location information comprises one or more global position system (GPS) coordinates and the MBS recognizes the CA based on a comparison of a threshold-D with density of the CDs in a GPS area defined by the GPS coordinates; and
   delivering out by the MBS the one or more access control parameters for having a group of user equipments located in the CA to access the resources based on the access control parameters.

47. A system of location information based communication control comprising:
   a master base station (MBS) comprising:
   a receiving unit receiving one or more feedback information provided by one or more communication devices (CDs), wherein the CDs include one or more user equipment (UEs) and/or one or more small base stations (SBSs), and each of the feedback information is associated with an overload or under-load status of a resource applied for the user equipments to transmit;
   a processing unit performing an access control to one or more resources by generating one or more access control parameters of the resources based on the feedback information and recognizing a control area (CA) based on a location information included in the feedback information, wherein the location formation comprises one or more global position system (GPS) coordinates and the MBS recognizes the CA based on a comparison of a threshold-D with density of the CDs in a GPS area defined by the GPS coordinates;
   and a transmitting unit delivering out the one or more access control parameters for having a group of user equipments located in the CA to access the resources based on the access control parameters.

48. A system of location information based communication control comprising:
a communication device (CD) comprising:
a processing unit generating one or more feedback information, wherein the feedback information comprise a location information which comprising a global position system (GPS) coordinate for having a master base station (MBS) recognizes a control area (CA) based on a threshold-D with density of a plurality of communication devices (CDs) in a GPS area defined by the GPS coordinate, wherein each of the feedback information is associated with an overload or under-load status of a resource applied for user equipments to transmit;
a transmitting unit delivering out the feedback information for having the MBS provides one or more access control parameters of one or more resources; and
a receiving unit receiving message, or the access control parameters provided by the MBS for having a group of user equipments located in the CA to access the resources based on the access control parameters in response to deliver out the feedback information.

* * * * *